US011335072B2

(12) United States Patent
Kanski et al.

(10) Patent No.: US 11,335,072 B2
(45) Date of Patent: May 17, 2022

(54) SYSTEM FOR THREE DIMENSIONAL VISUALIZATION OF A MONITORED ITEM, SENSORS, AND RECIPROCAL RENDERING FOR A MONITORED ITEM INCORPORATING EXTENDED REALITY

(71) Applicant: UrsaLeo Inc., San Francisco, CA (US)

(72) Inventors: Ian Kanski, San Francisco, CA (US); Jason Gosnell, San Francisco, CA (US)

(73) Assignee: UrsaLeo Inc., San Francisco, CA (US)

( * ) Notice: Subject to any disclaimer, the term of this patent is extended or adjusted under 35 U.S.C. 154(b) by 0 days.

(21) Appl. No.: 17/337,741

(22) Filed: Jun. 3, 2021

(65) Prior Publication Data

US 2021/0383611 A1 Dec. 9, 2021

Related U.S. Application Data

(60) Provisional application No. 63/034,383, filed on Jun. 3, 2020.

(51) Int. Cl.
| | |
|---|---|
| *G06T 19/00* | (2011.01) |
| *G06T 17/00* | (2006.01) |
| *G06T 19/20* | (2011.01) |
| *G06F 3/04815* | (2022.01) |
| *G06F 3/048* | (2013.01) |

(52) U.S. Cl.
CPC ............ *G06T 19/006* (2013.01); *G06F 3/048* (2013.01); *G06F 3/04815* (2013.01); *G06T 17/00* (2013.01); *G06T 19/20* (2013.01)

(58) Field of Classification Search
None
See application file for complete search history.

(56) References Cited

U.S. PATENT DOCUMENTS

| | | | | |
|---|---|---|---|---|
| 8,452,435 | B1* | 5/2013 | Vieilly | G06T 19/20 700/98 |
| 2009/0087029 | A1 | 4/2009 | Coleman et al. | |
| 2013/0293468 | A1* | 11/2013 | Perez | G06F 21/32 345/158 |
| 2014/0168423 | A1* | 6/2014 | Koga | H04W 4/44 348/135 |

(Continued)

FOREIGN PATENT DOCUMENTS

KR 20180131018 A 12/2018

*Primary Examiner* — Robert J Craddock
(74) *Attorney, Agent, or Firm* — Houda El-Jarrah; Bold IP, PLLC

(57) ABSTRACT

An application is presented for providing a highly accurate and realistic 3D virtual model of monitored items. The 3D virtual model may include virtual icons that represent a set of sensors. Data visualizations are provided in the 3D virtual model depicting relevant information about the monitored items and the set of sensors. Alarms can be triggered if the sensor exceeds normal operating thresholds and a user directed to a specific sensor that is malfunctioning or subject to the alert. The user can rewind through the virtual model to view events leading up to the alarm or malfunctioning of the monitored item. Further, a 3D virtual model can be reciprocally rendered as a digital twin on a second user's computing device and any extended reality graphical manipulation shared with the second user whether the second user is physically adjacent to a monitored item or remote from a monitored item.

26 Claims, 32 Drawing Sheets

(56) References Cited

U.S. PATENT DOCUMENTS

2014/0200863 A1 7/2014 Kamat et al.
2017/0176033 A1 6/2017 Tan et al.
2017/0208151 A1 7/2017 Gil et al.

\* cited by examiner

SYSTEM FOR THREE DIMENSIONAL VISUALIZATION OF A MONITORED ITEM, SENSORS, AND RECIPROCAL RENDERING FOR A MONITORED ITEM INCORPORATING EXTENDED REALITY

CROSS-REFERENCE TO RELATED APPLICATIONS

This application is a non-provisional application which claims priority to U.S. Provisional Patent Application No. 63/034,383 filed on Jun. 3, 2020, which is incorporated by reference in its entirety.

FIELD OF THE DISCLOSURE

This disclosure generally relates to computer implemented systems and methods for creating and using highly realistic (photorealistic) three dimensional (3D) virtual models of any type of monitored item, including at one or more facilities, whereby the monitored item may be associated with a group of sensors. More specifically, the present disclosure relates to computer implemented systems and methods for providing highly accurate 3D visualization models of monitored items that capture the location and data obtained from sensors distributed throughout the facilities. Further, the disclosure relates to computer implemented systems for reciprocal rendering of graphical manipulation between a 3D virtual model of monitored items and a digital twin model having an Extended Reality (XR) endpoint, including augmented reality, virtual reality, and mixed reality. Further, the application may be used to physically and digitally control various aspects of the physical asset or monitored item.

BACKGROUND

Sensors are a necessary and particularly important part of many industries for various reasons. Sensors are used to monitor equipment and environmental conditions in a facility and to determine if normal operating conditions are taking place. The data obtained from sensors is analyzed and monitored to determine if any maintenance or troubleshooting is needed. The data obtained from the sensors is typically provided to the facility or industry in the conventionally known manner. Typically, data obtained from oftentimes numerous sensors is displayed through a series of two dimensional (2D) components, such as gauges, charts, or plots of the data over time. This collection of data may be assembled and made available for review either on paper or on a computer, but usually without any spatial context. Further, a user or viewer of these 2D data representations may not necessarily be familiar with the location and layout of a facility where these sensors are located. Viewing thousands of data points on traditional dashboards involves searching through many layers to reach the required data and is not a productive or efficient use of time.

The data provided by the sensors may be crucial if a system failure or problem occurs at a facility because the administration of the facility may use the data provided by the sensors to reconstruct what happened and what led to the system failure or accident. Currently, a great deal of time and effort is required by multiple parties to look over the various pieces of data and information available about how a piece of equipment was working or what the conditions in the facility were like prior to the occurrence of the system failure or problem. Additionally, facilities spend a great deal of time putting together incident or accident reports for a system failure or problem and spend a great deal of time creating digital or paper reports that require assembling the plethora of data from the graphs, charts, tables, and databases incorporating any sensor data.

Lacking from the existing methods of analyzing sensor data is the ability to monitor the output from a sensor (i.e., sensor data) using a three dimensional (3D) virtual model of the facility that the sensors are located at, whereby the 3D virtual model includes the sensors and sensor data in real time. Further, lacking from the existing methods is the ability to use a 3D virtual model to look at historical sensor data and to replay a sequence of events to reconstruct what happened prior to a system failure or problem occurring for any monitored items at a facility or any other location.

Additionally, current systems do not allow for reciprocal rending of a 3D model in a physical location adjacent to a monitored item or for any graphical manipulation of that 3D model to provide for more collaboration and understanding between users and viewers of the 3D model and the monitored item and/or sensor at hand. Further, current systems do not allow for reciprocal rending of a 3D model in a local environment of a second user regardless of the location of the monitored item or sensor. One or more systems described herein may address these and other issues.

SUMMARY

One or more embodiments are provided for a virtual visualization of one or more monitored items having a set of actual sensors. The system may include in a non-limiting embodiment, a computing device having a display screen, one or more memory, and one or more processors configured to display a three-dimensional (3D) virtual model of the one or more monitored items, whereby the 3D virtual model includes a set of virtual sensors depicting the set of actual sensors, whereby each sensor of the set of virtual sensors in the 3D virtual model is displayed in the same location as an actual sensor of the set of actual sensors would be positioned. The system may further provide a visualization of relevant data for each virtual sensor of the set of virtual sensors corresponding to each actual sensor of the set of actual sensors and may further include navigating through the 3D virtual model to view any virtual sensor of the set of virtual sensors to monitor the one or more monitored items and the set of actual sensors in real time, whereby views of the 3D virtual model may be altered and viewed from multiple angles and perspectives. Responsive to a threshold level being triggered for an actual sensor of the actual set of sensors that exceeds normal operating conditions, the system may include directing attention to a virtual sensor representing the actual sensor that exceeds normal operating conditions, further comprising, drawing attention to the virtual sensor exceeding the normal operating conditions in the 3D virtual model and providing an alert, whereby the alert comprises a visual alert, an audio alert, or a combination of a visual and audio alert.

The system may further include allowing a user to navigate through the 3D virtual model to view historical data of any virtual sensor of the set of virtual sensors by rewinding or replaying a stored version of the 3D virtual model. The system may be configured to draw attention to the virtual sensor exceeding the normal operating conditions in the 3D virtual model by automatically zooming in on the virtual sensor exceeding the normal operating conditions in the 3D virtual model. The 3D virtual model may further depict interior contents of the one or more monitored items. The 3D virtual model may further comprise a sensor cluster that groups together the set of virtual sensors of the 3D virtual model and displays relevant information for each virtual sensor in the sensor cluster. The system may further include metadata for each virtual sensor is available for viewing in the 3D virtual model. One or more reports or documents incorporating segments or snapshots of the 3D virtual model may be generated using the system.

In another embodiment, the system may allow for displaying graphical manipulations of a 3D virtual model from a first user to a second user, whereby the second user is physically adjacent to the monitored item. The system may further display a 3D virtual model on a first computing device of a first user and display the graphical manipulation of the 3D virtual model on the first computing device of the first user. The system may further display reciprocal renderings of the graphical manipulation on a second computing device of a second user, whereby the second user is physically adjacent to a monitored item that is illustrated in the 3D virtual model. In one or more non-limiting embodiments, the graphical manipulations may comprise annotations to the 3D virtual model including text, shapes, and images or an exploded view of the monitored item. The graphical manipulations may further comprise highlighting one or more components of the monitored item. Further, the one or more processors are configured to display the graphical manipulations of the 3D virtual model as an overlay, whereby the second user positions the second computing device proximate to the monitored device to view the graphical manipulations overlaid over the monitored item from the second computing device. The one or more processors are configured to display all or a portion of the 3D virtual model adjacent to the monitored item. In a non-limiting embodiment, the first user can guide a viewpoint of the second user when viewing the 3D virtual model for directed alignment. In a non-limiting embodiment, the 3D virtual model includes an editing tool to add annotations and other actions to create the graphical manipulations of the 3D virtual model. Further, the graphical manipulations may be rendered and displayed as a type of extended reality on the second computing device of the second user including, but not limited to, a type of augmented reality.

In another embodiment, the present description may include description for a system for displaying graphical manipulations of a 3D virtual model from a first user to a second user, whereby the first user and the second user are physically remote from the monitored item. The system may further be able to display a 3D virtual model of a monitored item on a first computing device of a first user, whereby the 3D virtual model is a highly accurate and photorealistic 3D virtual model of the monitored item. The system may further be able to display the graphical manipulations of the 3D virtual model on the first computing device of the first user, whereby the graphical manipulations are made by the first user on the 3D virtual model of the monitored item and may further display a projected digital twin rendering of all or a part of the 3D virtual model in a local environment for a second user using a second computing device. Further, the first user and the second user are not physically adjacent to a monitored item that is illustrated in the 3D virtual model.

Other aspects and advantages of the invention will be apparent from the following description and the appended claims.

BRIEF DESCRIPTION OF THE DRAWINGS

The preceding and following embodiments and descriptions are for illustrative purposes only and are not intended to limit the scope of this disclosure. Other aspects and advantages of this disclosure will become apparent from the following detailed description.

Embodiments of the present disclosure are described in detail below with reference to the following drawings. The drawings described herein are for illustrative purposes only of selected embodiments and not all possible implementations and are not intended to limit the scope of the present disclosure.

DETAILED DESCRIPTION

Figure 1:
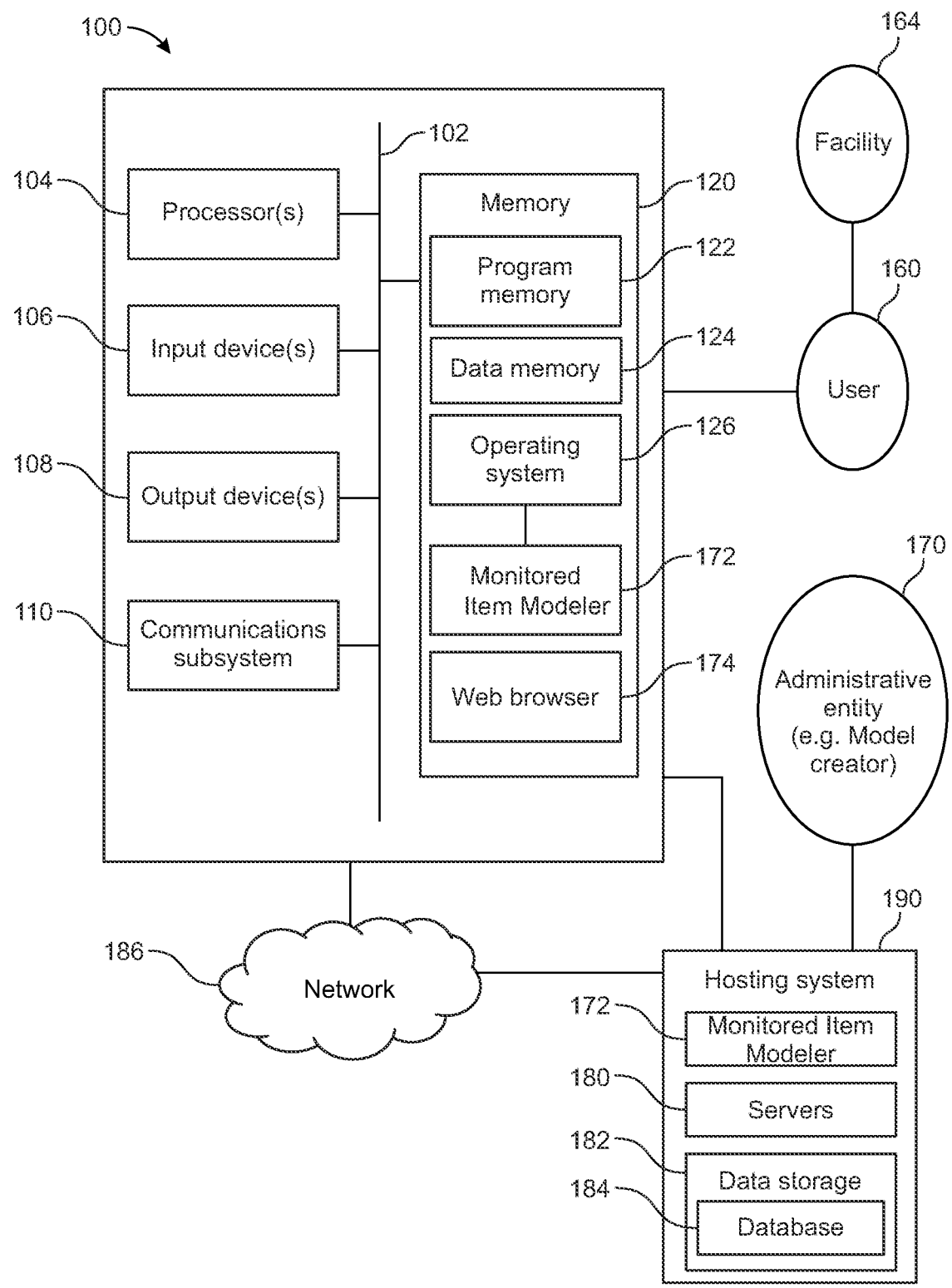
FIG. 1 is a block diagram depicting computing devices, components, and systems for implementing a monitored item modeling system that further can model one or more sensors associated with the monitored item in accordance with one or more illustrative embodiments.

In the Summary above and in this Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with; and/or in the context of other particular aspects and embodiments of the invention; and in the invention generally.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" is used herein to mean "serving as an example, instance, or illustration." Any aspect described in this document as "exemplary" is not necessarily to be construed as preferred or advantageous over other aspects.

The term "set" as used herein may refer to one or more. Accordingly, a set may include one item or several items.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

As noted above, many facilities or organizations include multiple sensors distributed throughout the facility or organization that capture important data regarding one or more pieces of equipment or condition in the facility or organization. For some facilities, especially those in the industrial setting, it is not unusual for there to be hundreds or thousands of sensors distributed around the facility that need to be monitored. Capturing and managing the sensor readings and data obtained from these sensors is a difficult and time-consuming process. Important decisions regarding the facility's operation are regularly made based on data obtained from sensors so it is important to be able to track and monitor these sensors correctly and efficiently. Further, the data obtained from the sensors included in a facility is very important for reconstruction of a system failure or problem that occurs at a facility so there is a need for efficiently and accurately replaying historical sensor data to use to understand the sequence of events that led up to a system failure or problem. Further, it would be helpful to be able to have collaborative and interactive sessions in which a first user may view a 3D virtual model in one remote location and a second user to be able to view any graphical manipulations of the 3D virtual model (e.g., annotations, visualizations, sensor readings or data, exploding views) by the first user to either be displayed on a twin 3D virtual model on a computing device of the second user (or additional users) with the same graphical manipulations displayed on the twin 3D virtual model whether the second or more users are located physically adjacent to the monitored item or not.

Accordingly, one or more embodiments described herein provide for a computer implemented system that can create and implement a highly accurate three dimensional (3D) virtual models of a facility that includes accurate visualization of any sensors located in the facility, including their placement and current output. Notably, the one or more systems allow a facility and its users to provide for the computer-implemented system to manage the data obtained from these sensors on a computing device for either monitoring the sensors in real time. Additionally, the one or more systems described herein allow a facility and its users to rewind, forward, pause, and play any sensor data as represented on the 3D virtual model so as to view historical sensor data. This feature is particularly unique and helpful when troubleshooting or reconstructing a sequence of events that led up to a system failure or problem at a facility. Additionally, data visualizations, such as graphs, charts, tables, or maps, may be included directly in the sensor modeling system so that the user can view a comprehensive display of sensor data in the sensor modeler itself. Additionally, the one or more computer implemented systems described herein provide for reciprocal rendering of a 3D virtual model provided from a host computing device. The reciprocal rendering of the 3D virtual model may be in the form of overlay graphics that can be overlaid on top of a physical asset (i.e., monitored item). Additionally, or alternatively, the 3D virtual model may be projected physically adjacent to a physical asset or monitored item or may be projected in any local space of a user whether or not the user is next to a monitored item or not. Other benefits and advantages are described further below with respect to the Figures.

Turning to FIG. 1, FIG. 1 illustrates an exemplary system for one or more computing devices and the various exemplary components that may be employed in practicing one or more non-limiting embodiments of the invention as described herein. Computing device 100 may be any type of computing device known or to be created in the future. This may include, without limitation, fixed in place computers, such as desktop computers or mobile computing devices. Mobile computing devices may include, but are not limited to, laptop computers, smartphones and mobile phones, tablets, wearable electronic computing devices such as watches or glasses, or any other type of mobile electronic, computing device.

FIG. 1 provides a schematic illustration of one embodiment of a computing device 100 that can perform the methods provided by the various other listed embodiments, as described herein, and/or can function as the host computer system, a remote kiosk/terminal, a point-of-sale device, a mobile device, a set-top box and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

Computing device 100 may be any type of information handling system, including, but not limited to, any type of computing device as noted above. To reiterate, this may include small handheld devices, such as handheld computer/mobile telephones or may include large mainframe systems, such as a mainframe computer. Further examples of handheld computing devices may include personal digital assistants (PDAs), personal entertainment devices, such as MP3 players, portable televisions, and compact disc players. Other examples of computing devices 100 may include, but are not limited to, laptops, notebooks, workstation computers, personal computer systems, as well as servers (e.g., servers 182). Computing devices 100 can be used by various parties described herein and may be connected on a computer network, such as computer network 186. Types of computer networks that can be used to interconnect the various information handling systems may include, but are not limited to, Local Area Networks (LANs), Wireless Local Area Networks (WLANs), the Internet (e.g., World Wide Web), the Public Switched Telephone Network (PSTN), other wireless networks, and any other network topology that can be used to interconnect the information handling systems.

The computing device 100 is shown comprising hardware elements that can be electrically coupled via a bus 102 (or may otherwise be in communication, as appropriate). The hardware elements of computing device 100 may include one or more processors 104, including without limitation one or more general-purpose processors and/or one or more special-purpose processors (such as digital signal processing chips, graphics acceleration processors, and/or the like). Computing device 100 may further include one or more input devices 106, which can include without limitation one or more cameras, sensors (including inertial sensors), a mouse, a keyboard and/or the like, which may be utilized in the implementation of monitored item modeler 172.

In addition to the above, computing device 100 may include one or more output devices 108 such as the device display. Furthermore, in some embodiments, an input device 106 and an output device 108 of computing device 100 may be integrated, for example, in a touch screen or capacitive display as commonly found on mobile computing devices as well as desktop computers and laptops.

Processors 104 may have access to a memory such as memory 120. Memory 120 may include one or more of various hardware devices for volatile and non-volatile storage and may include both read-only and writable memory. For example, memory 120 may comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory 120 is not a propagating signal divorced from underlying hardware; a memory is thus non-transitory. Memory 120 may include program memory such as program memory 122 capable of storing programs and software, such as an operating system such as operating system 126, monitored item modeler 172, and other computerized programs or application programs. Memory 120 may also include data memory such as data memory 124 that may include database query results, configuration data, settings, user options or preferences, etc., which may be provided to program memory 122 or any element of computing device 100.

The computing device 100 may further include (and/or be in communication with) one or more non-transitory storage devices, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage may be used in a number of embodiments discussed herein. Further, the storage devices may be non-volatile data storage devices in one or more non-limiting embodiments. Further, computing device 100 may be able to access removable nonvolatile storage devices that can be shared among two or more information handling systems (e.g., computing devices) using various techniques, such as connecting the removable nonvolatile storage device to a USB port or other connector of the information handling systems.

The computing device 100 might also include a communications subsystem 110, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 110 may permit data to be exchanged with a network (e.g., such as network 186), other computer systems, and/or any other devices.

The computing device 100 also can comprise software elements, shown as being currently located within the memory 120, which in some instances may include an operating system 126, device drivers, executable libraries, and/or other code, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer). In an aspect, then, such code and/or instructions can be used to configure and/or adapt computing device 100 to perform one or more operations in accordance with the described methods.

A set of these instructions and/or code might be stored on a computer-readable storage medium, such as the storage device(s) described above. In some cases, the storage medium might be incorporated within a computer system, such as computing device 100. In other embodiments, the storage medium might be separate from computing device 100 (e.g., a removable medium, such as a compact disc or USB stick), and/or be provided in an installation package, such that the storage medium can be used to program, configure, and/or adapt a general purpose computer with the instructions/code stored thereon. These instructions might take the form of executable code, which is executable by the computing device 100 and/or might take the form of source and/or installable code, which, upon compilation and/or installation on the computing device 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computing device 100) to perform methods in accordance with the disclosure. For example, some or all of the procedures of the described methods may be performed by the computing device 100 in response to one or more processors 104 executing one or more sequences of one or more instructions (which might be incorporated into the operating system 126 and/or other code contained in the memory 120). Such instructions may be read into the memory 120 from another computer-readable medium, such as one or more of the storage device(s). Merely by way of example, execution of the sequences of instructions contained in the memory 120 may cause the one or more processors 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 100, various computer-readable media might be involved in providing instructions/code to the one or more processors 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media may include, for example, optical and/or magnetic disks which may be an example of storage devices. Volatile media may include, without limitation, dynamic memory, which may be a type of memory included in memory 120. Transmission media may include, without limitation, coaxial cables, copper wire and fiber optics, including the wires that comprise the bus 102, as well as the various components of the communications subsystem 110 (and/or the media by which the communications subsystem 110 provides communication with other devices). Transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 110 (and/or components thereof) generally will receive the signals, and the bus 102 then might carry the signals (and/or the data, instructions, etc. carried by the signals) to the memory 120, from which the one or more processors 104 retrieves and executes the instructions. The instructions received by the memory 120 may optionally be stored on a non-transitory storage device either before or after execution by the processor(s) 104.

In one or more embodiments, computing device 100 is in communication with one or more networks, such as network 186. Network 186 may include a local area network (LAN), such as a company Intranet, a metropolitan area network (MAN), or a wide area network (WAN), such as the Internet or World Wide Web. Network 186 may be a private network, a public network, or a combination thereof. Network 186 may be any type of network known in the art, including a telecommunications network, a wireless network (including Wi-Fi), and a wireline network. Network 186 may include mobile telephone networks utilizing any protocol or protocols used to communicate among mobile digital computing devices (e.g., computing device 100), such as GSM, GPRS, UMTS, AMPS, TDMA, or CDMA. In one or more non-limiting embodiments, different types of data may be transmitted via network 186 via different protocols. In further non-limiting other embodiments, computing device 100 may act as a standalone device or may operate as a peer machine in a peer-to-peer (or distributed) network environment.

Network 186 may further include a system of terminals, gateways, and routers. Network 186 may employ one or more cellular access technologies including but not limited to: 2nd (2G), 3rd (3G), 4th (4G), 5th (5G), LTE, Global System for Mobil communication (GSM), General Packet Radio Services (GPRS), Enhanced Data GSM Environment (EDGE), and other access technologies that may provide for broader coverage between computing devices if, for instance, they are in a remote location not accessible by other networks.

In one or more non-limiting embodiments, a computing device, such as computing device 100 may include a web browser such as web browser 174. Web browser 174 may be any type of web browser known in the art that may be used to access one or more web applications (e.g., monitored item modeler 172) on user computing devices 100 or the like, Web applications are applications that are accessible by network 186 and may be located on the Internet or World Wide Web. Web browser 174 may include a variety of hardware, software, and/or firmware generally operative to present a web application to a user via a display device 108 (e.g., touchscreen or other type of monitor or display device) on a computing device. Examples of suitable web browsers include, but are not limited to, MICROSOFT EXPLORER, MOZILLA FIREFOX, and APPLE SAFARI. Web browser 174 may be previously installed by the manufacturer or company associated with the computing device 100, or alternatively, may be downloaded onto computing device 100 or any other computing device. Web browser 174 may be stored in a separate storage device and/or memory 120.

In one or more non-limiting embodiment, monitored item modeler 172 may be a software program or module configured to create and/or display 3D virtual models (e.g., 3D virtual model 202 in FIG. 2) of a facility, such as facility 164 shown in FIG. 1. It is noted that facility 164 is not limited to an industrial location and may represent any type of location in any type of environment, whether an industrial facility or otherwise.

Figure 2:
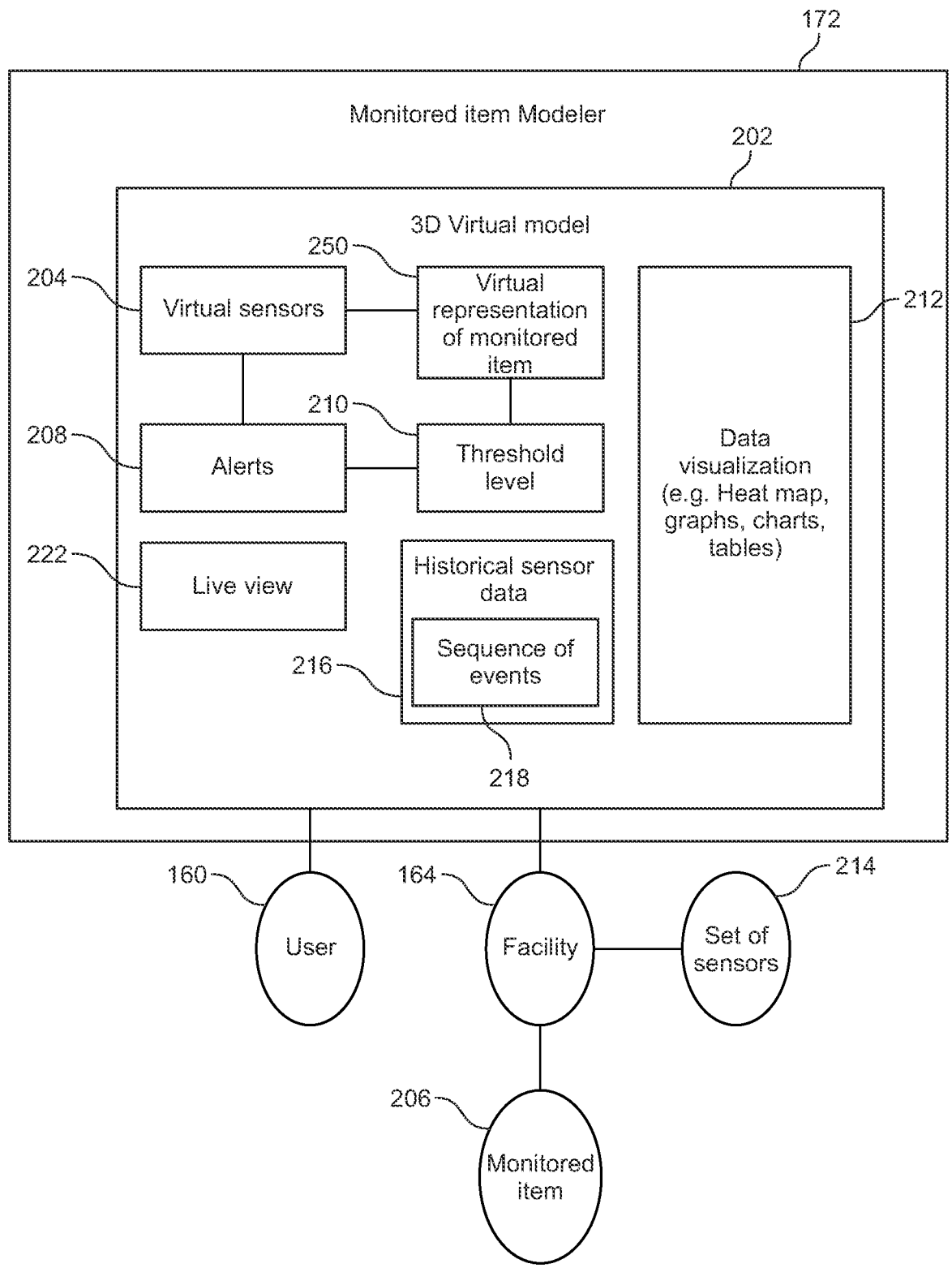
FIG. 2 is another block diagram of components of a computer implemented monitored item modeling system in accordance with an illustrative embodiment.

Monitored item modeler 172 may provide an interactive computer based platform or software module that allows users to view the 3D virtual model 202 of the facility 164, whereby the user 160, as shown in FIG. 2, can view any part of the 3D virtual model from any side or direction, as well as view any virtual representation of sensors 204 and sensor data in the 3D virtual model 202 (e.g., as shown in FIG. 2). Further, monitored item modeler 172 may be an integrated system that allows the users 160 or any other relevant party to rewind and replay a recorded or stored copy of the 3D virtual model 202 in order to view historical sensor data and past conditions at facility 164. Further information about monitored item modeler 172, in one or more non-limiting embodiments, is provided below with respect to FIG. 2-FIG. 28B. In one or more non-limiting embodiments, the user 160 is a client or person who may or may not be associated with the facility 164 with access privileges to view and interact with monitored item modeler 172.

In one or more non-limiting embodiments, monitored item modeler 172 may be implemented as a web service. As known in the art, a web service may be a software module or software program (e.g., monitored item modeler 172) that is designed to implement a set of tasks that is accessible from multiple computing devices, such as computing device 100 over a network, such as network 186. In particular, monitored item modeler 172 may be implemented as a web service accessible using the World Wide Web as the connecting network 186, although any alternative type of network may be used. Monitored item modeler 172, when implemented as a web service, can be searched by any user (e.g., user 160) using web browser 174. Modeling item modeler 172 when implemented as a web service can be searched for over the network 186 using the input devices 106 of a computing device and can also be invoked accordingly. Further, monitored item modeler 172 when invoked as a web service would be able to provide functionality to the client or user which invokes that web service.

When monitored item modeler 172 is implemented as a web service, a client or party may invoke a series of web service calls via requests to one or more servers 180 that are part of the hosting system 190 which would host the actual web service. In one or more non-limiting embodiments, hosting system 190 may be a cloud-based type hosting system. "Cloud-based" is a term that refers to applications, services, or resources (e.g., monitored item modeler 172) made available to users on demand via a network, such as network 186, from a cloud computing provider's server. In one non-limiting embodiment, administrative entity 170 may be the cloud computing provider and may use servers 180 to provide access to monitored item modeler 172.

Hosting system 190 may include data storage systems 182 that can provide access to stored data by applications running on computing devices (e.g., 100) that may be geographically separate from each other, provide offsite data backup and restore functionality, provide data storage to a computing device with limited storage capabilities, and/or provide storage functionality not implemented on a computing device (e.g., 100).

The hosting system 190 may be a service that can be implemented as a web service, in one or more non-limiting embodiments, with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Any programming languages may be used to create or operate monitored item modeler 172 as a web service, including, but not limited to .Net, Java, and XML. Further, monitored item modeler 172 as a web service may use standardized industry protocol for the communication and may include well-defined protocols, such as Service Transport, XML Messaging, Service Description, and Service Discovery layers in the web services protocol stack.

For instance, the hosting system can be implemented such that client applications (for example, executing on computing device 100) can store, retrieve, or otherwise manipulate data objects in the hosting system 190. The hosting system 190 can be implemented by one or more server devices 180, which can be implemented using any type of computing device.

In one or more non-limiting embodiments, administrative entity 170 is the provider and creator of monitored item modeler 172. Administrative entity 170 may provide the application programming interface (e.g., monitored item modeler 172) for use by user 160 at facility 164. Administrative entity 170 may be able to manipulate and alter monitored item modeler 172 to affect the operation and maintenance of monitored item modeler 172 on servers) 180 and as stored on one or more data storage devices 182 that are part of the hosting system 190. Data storage devices 182 included for storing any data associated with monitored item modeler 172 may include one or more databases 184 that store live and historical sensor data in one or more non-limiting embodiments. Data storage devices 182, via databases 184 in some cases, may be able to store all sensor data obtained from one or more actual sensors (e.g., set of actual sensors 214 as shown in FIG. 2) from facility 164 or any other physical location. While administrative entity 170 is depicted as a single element communicating over network 186 and through the hosting system 190 it is noted that administrative entity 170, in one or more non-limiting embodiments, may be distributed over network 186 in any number of physical locations.

In other embodiments, the administrative entity 170 may not be the creator of the 3D virtual model 202 as shown in FIG. 2. In some cases, a user, such as user 160 may be enabled to create the 3D virtual model 202 using one or more methods described below. In other cases, another software application may be used to create and provide a highly accurate 3D virtual model 202 of one or more monitored items 206 and/or facility 164.

Typically, in one or more non-limiting embodiments, administrative entity 170 may be the model creator. Accordingly, administrative entity 170 may initially create and maintain the 3D virtual model 202 as described in FIG. 2, which allows the user 160 to view the virtual replica or visualization of a real world facility 164.

In one or more non-limiting embodiments, monitored item modeler 172 may alternatively be a downloadable software module that is capable of being stored directly on a computing device, such as computing device 100, rather than acting as a web service accessible through a computing device's web browser 174. Accordingly, any user may be able to download and store monitored item modeler 172 on computing device 100 as a computer based application and software module that runs using the working engines and modules on the computing device. In some embodiments, monitored item modeler 172 may be preinstalled on computing device 100 or any other computing device by the manufacturer or designer or other entity. Monitored item modeler 172 may be innate, built into, or otherwise integrated into existing platforms such as, without limitation thereto, a website, third-party program, iOS™, Android™, Snapchat™, Getty Images™, Instagram™, Facebook™ or any other platform capable transmitting, receiving, and presenting data.

Monitored item modeler 172 may be stored on computing device 100 or any other computing devices and may also be stored or otherwise accessible by one or more servers 180 over network 186 by any party. The storage devices may include a non-transitory computer readable medium including instructions, which when executed by a computer or processor (such as processors 104) may cause the computer or processor to perform operations to implement monitored item modeler 172. Additionally, or alternatively, monitored item modeler 172 may be a software application that is downloadable and usable from any type of mobile computing device 100.

As shown in FIG. 1, computing device 100 may belong to a user referred to in FIG. 1 such as user 160. User 160 may be a user that intends to access monitored item modeler 172 using his or computing device 100 to view one or more 3D virtual models of a facility, such as facility 164.

As noted above, in one non-limiting embodiment, monitored item modeler 172 may be implemented as a web service as described above. Accordingly, monitored item modeler 172 may be accessed by any party, including user 160, over the computer network 186 using their web browsers 174 to view one or more 3D virtual models 202 or to use other features included with monitored item modeler 172. Further information about other components of monitored item modeler 172 are included below with respect to FIG. 2-FIG. 28B.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Turning to FIG. 2, FIG. 2 is a block diagram of various components that may be included in one or more embodiments of a computer based sensor modeler, such as monitored item modeler 172. As noted above, monitored item modeler 172 may be used to create and/or access one or more 3D virtual models 202 of one or more monitored items 206. The monitored items 206, as referred to herein, are all physical devices that exist in the real world and may be referred to as physical assets. The monitored items 206 are actual physical assets that one or snore users 160-162 have to monitor for performance or operational or education reasons (or any other reason). The monitored items 206 can be one component of a larger set of components or system in a facility 164 or other location, or alternatively, the monitored items 206 can fully reflect the entire system and all sets of components in some cases.

In some cases, the one or more monitored items 206 may include a set of actual sensors, such as set of sensors 214. In some cases, the one or more monitored items 206 may include a set of actual sensors 214 and may further be located at a facility 164. Monitored item modeler 172 and 3D virtual model 202 may be used to monitor live sensor data as well as replay historical sensor data in one or more non-limiting embodiments. Many other useful features and functions are also provided by monitored item modeler 172 as further described below.

In one or more non-limiting embodiments, monitored item modeler 172 includes 3D virtual model 202 which may include 3D visualization of multiple elements including a virtual representation of one or more monitored items 250. In some cases, the 3D virtual model 202 incorporates a virtual representation of a facility 164 as well as a virtual representation 250 of the one or more monitored items 206 and virtual sensors 204. In other instances, the 3D virtual model 202 may not represent a virtual representation of a facility 164, but only that of the monitored item 206 and/or virtual sensors 204.

3D virtual model 202 is thus displayed and accessible on a computing device 100 of any user via a downloaded application, such as monitored item modeler 172, stored on the computing device 100 in some cases or accessible from a computing device 100 as a web service that is hosted on one or more servers 190 by administrative entity 170.

Figure 13:
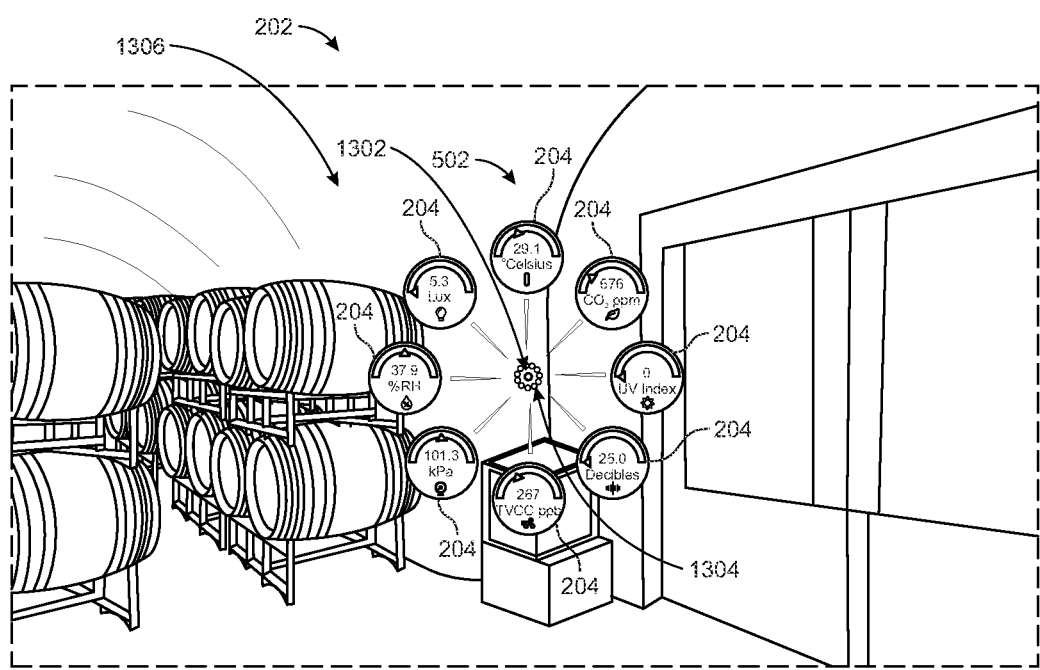
FIG. 13 is a pictorial illustration of a sensor cluster visible in a 3D virtual model for another facility in accordance with an illustrative embodiment.

As used herein, the term "model" may interchangeably be used with "visualization" or "replica," 3D virtual model 202 is a three-dimensional replica of one or more monitored items 206 and may also include a three-dimensional replica of a facility such as facility 164. 3D virtual model 202 may be a replica of all or a part of monitored items 206 and/or facility 164. Facility 164 may be any type of facility, organization, institution, business, or other location. In sonic cases, facility 164 may be an industrial setting, such as an oil and gas facility, a manufacturing facility or plant, or another type of industrial or commercial facility. In other cases, facility 164 may be a hospital, laboratory, or residential complex. These listed locations are intended to serve as examples, without limitation thereto, as facility may be a broad term that encompasses any location or structure. Monitored item 206 may be any type of object, device, system, or any other element that needs to be monitored regardless of whether monitored item 206 is located at an industrial facility or not. For example, FIGS. 13-16 show 3D virtual model 202 of a wine cellar and wine barrels, which may be examples of monitored items 206. Further, the general atmosphere in the wine cellar is also being monitored using one or more real sensors 214, by monitoring the temperature, humidity, noise level, light level, etc. (e.g., as shown in FIG. 13). Accordingly, any type of system or apparatus or device or environment may serve as a monitored item 206 in one or more non-limiting embodiments.

3D virtual model 202 is intended to be accessible and viewable on the display screen (e.g., output device 108) of a user's computing device (e.g., computing device 100 shown in FIG. 1). 3D virtual model 202 is configured to be fully interactable so that user 160 can view the 3D virtual model 202 of one or more monitored items 206 and of the facility 164 from multiple angles and perspectives. With respect to FIG. 2 and the 3D virtual model 202, the user 160 may use input device 108 (e.g., a mouse, keyboard, touchscreen) on his or her computing device 100 to rotate and change the display of the 3D virtual model 202 to reflect the view or perspective of the 3D virtual model 202 that the user 160 wishes to see.

Figure 17:
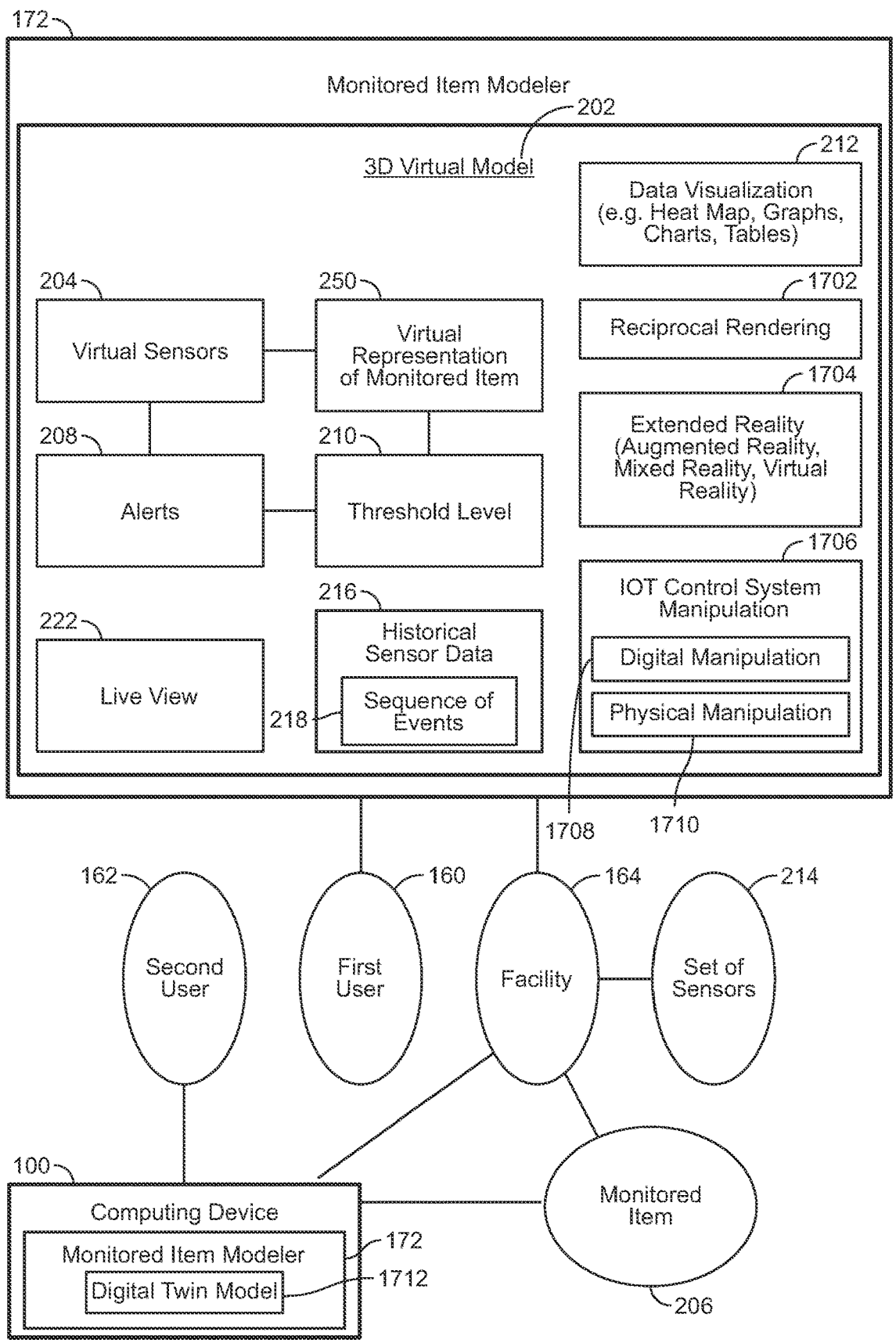
FIG. 17 is a block diagram of the monitored item modeling system having one or more functions relating to reciprocal rendering of the 3D virtual model for multiple users and which incorporates extended reality.

Further, the 3D virtual model 202 is fully interactive and includes multiple interfaces for collaboration between users, whether the users are located remote from each other or remote from the monitored items 206 and the facility 164. FIG. 17 is a block diagram that is further described below and includes further details about reciprocal rendering 1702, with the inclusion of extended reality 104 elements and IOT control system manipulation 1706.

It is noted that in some cases, there may not be sensors 214 associated monitored items 206. Rather, the monitored items 206 may have a 3D virtual model 202 without having virtual sensors 204 or actual set of sensors 214.

In one or more non-limiting embodiments, monitored items 206 and facility 164 may affirmatively include a set of actual sensors 214. As noted above, the term "set" as used herein may mean one or more. Accordingly, set of sensors 214 may refer to any number of actual, real sensors. The set of sensors 214 represent the real, physical sensors installed or otherwise located at the real world facility 164. Set of sensors 214 may be located and distributed throughout the facility 164 or in only certain areas or parts of the facility 164. Virtual sensors 204 are a set of virtual sensors 204 displayed in the 3D virtual model 202 in the same general location or position as the corresponding location or position for the set of real sensors 214 at the real facility 164. Virtual sensors 204 are the digital representation of the actual set of sensors 214 located at the real facility 164.

3D virtual model 202 is a highly accurate replica or reproduction of all or part of the facility 164 that is relevant to user 160 (i.e., any areas in the facility 164 that include set of sensors 204). By being able to view 3D virtual model 202, the user 160 is better able to visualize the environment in which the set of sensors 214 are located. Further, 3D virtual model 202 is configured to visually display the facility 164 to the user 160 even if a user 160 is very remote and far from facility 164, thereby allowing user 160 to make optimal decisions for the operation and maintenance of one or more pieces of equipment or elements at facility 164.

Set of sensors 214 may be used to monitor a number of items or conditions at the facility 164. Set of sensors 214 may monitor equipment or other physical items located at facility 164. Set of sensors 214 may also monitor non-physical items at the facility 164. Any type of sensor 214 may be used in facility 164 and replicated in 3D virtual model 202 as a virtual sensor 204. For example, without limitation thereto, set of sensors 214 may include sensors that measure temperature, fluid levels or volumes, carbon dioxide, humidity, air quality, pressure, sound, light, including infrared and ultraviolet levels, vibration, and magnetic field strength to name a few examples. Other types of sensors may include flow sensors, gas sensors, optical sensors, position sensors, proximity sensors, shock sensors, motion sensors, multifunctional sensors, touch sensors, or any other type of sensor known in the art or yet to be discovered.

Figure 3:
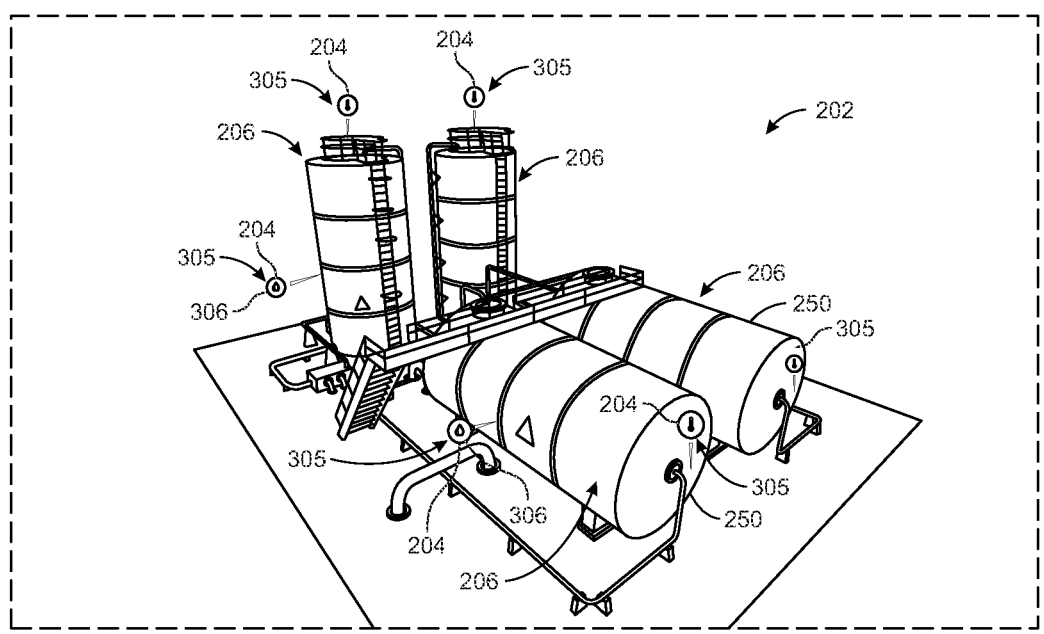
FIG. 3 is a pictorial illustration of an interface of a 3D virtual model of monitored items at a facility and associated sensors in accordance with an illustrative embodiment.

Monitored item 206 as shown in FIG. 2 may be a physical object, such as a piece of equipment at facility 164. Monitored item 206 may alternatively be a non-physical object, and may instead be a condition or quality, such as air quality, humidity, sound levels, or some other type of condition or quality of interest at facility 164. Set of sensors 214 is intended to monitor one or more attributes, variables, or features associated with monitored item 206. For example, as shown in FIG. 3, one or more tanks (e.g., monitored items 206) shown in the 3D virtual model in FIG. 3 may be monitored by one or more sensors 202 for fluid levels and temperature. The data obtained from the sensors 214 may be continuously displayed by the virtual sensors 202 to the user on the 3D virtual model 202 (e.g., 3D virtual model 202 as shown in FIG. 3 and FIG. 13) which correspond to the real sensors 214.

To create the 3D virtual model 202, a number of techniques may be used. In one non-limiting embodiment, cameras may be placed in the locations of interest at the facility 164, whereby the cameras take various photographs and/or video from various angles and directions to fully capture the layout of the facility 164. Further, in one non-limiting embodiment, the cameras at the facility 164 may be panned in a 360 degree direction to include photos and/or video of the targeted locations at the facility 164 in a 360 degree direction. Additionally, real world measurements may be taken at the facility 164 for any items of interest and structural components to understand the actual dimensions and positioning of any object or building element located in the facility 164. Using a combination of any or all of the captured photos and videos of the facility 164 from various angles and the dimensions and measurements obtained from the facility 164, the desired locations from the facility 164 can be reconstructed as a highly accurate 3D virtual model 202.

Other techniques involving LIDAR, radar, and/or photogrammetry may also be used. CAD drawings may be referenced when creating the 3D virtual model 202. Further, physical measurements and dimensions of the facility and any equipment or structures in the facility 164 may be taken as well to ensure that the 3D virtual model 202 is as accurate and comprehensive in scope and scale as possible. Each technique may be used individually or in combination with other techniques to create a highly accurate 3D virtual model 202. Accordingly, all of the real world features that are visible and unique to facility 164 may be replicated and displayed in 3D virtual model 202. Any structural pieces, equipment, furniture, landscaping, or layout in the real world facility 164 may be replicated and digitally represented in the 3D virtual model 202. As shown by the 3D virtual model 202 in FIG. 3-12 of the oil and gas facility and by the 3D virtual model 202 of the winery 1306 shown in FIGS. 13-16, the 3D virtual model 202 can capture any type of facility and appear as a virtual world for that facility.

In one or more non-limiting embodiments, the set of virtual sensors 204 are placed in the same or approximately the same locations in the 3D virtual model 202 as the actual real world locations of the set of sensors 214 located at the facility 164. Further, virtual sensors 204 may be associated with the corresponding monitored items 206 in the 3D virtual model 202 as in reality at the facility 164. Advantageously, the 3D virtual model 202 usefully replicates for a user 160 via the virtual sensors 204 the actual location of any real sensors 214 and monitored items 206 in the facility 164 itself. Further, the user 160 can access this information while working at the facility 164 or remotely from the facility 164 via his or her device 100. This highly accurate, sophisticated, detailed visualization provided by the 3D virtual model 202 of the facility 164 may make it possible for user 160 to better monitor the operation of facility 164. If new sensors 214 are brought online and added to the real facility 164 or existing sensors 214 are moved, the 3D virtual model 202 can be updated accordingly to reflect these changes.

3D virtual model 202 may include the ability to alert the user 160 and draw his or her attention to any particular sensor 214 that may not be operating normally. Alerts 208 may be in the form of audio alerts, visual alerts, or a combination thereof. Each virtual sensor 204 in the 3D virtual model 202 may be associated with a threshold level 210. The threshold level 210 may indicate that the real sensor 214 at the facility 164 is not operating in a normal or acceptable fashion or within acceptable ranges because a real sensor 214's readings or data exceeds normal operating conditions.

Figure 7:
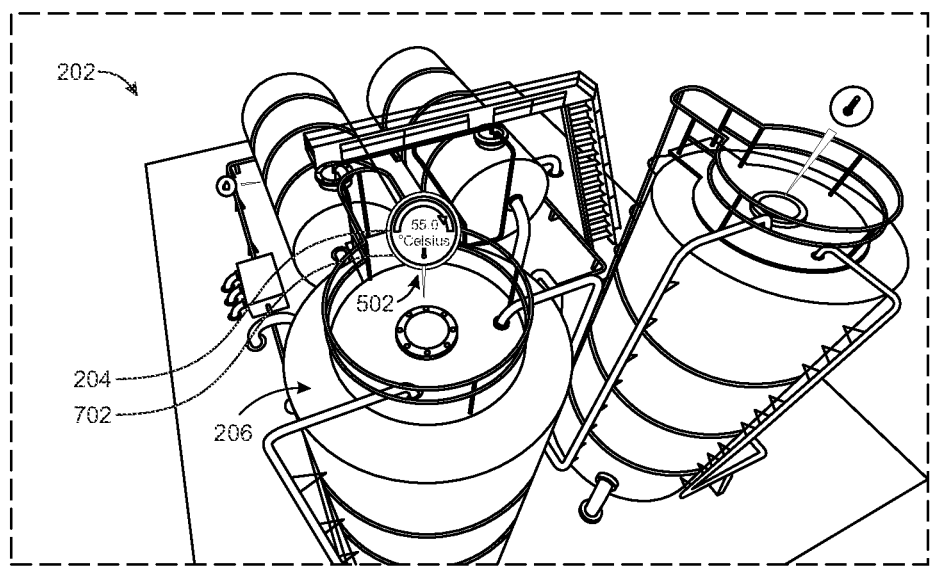
FIG. 7 is a pictorial illustration of an interface showing a visual alert for a sensor in a 3D virtual model in accordance with an illustrative embodiment.

The alerts 208 may be triggered when data obtained from any sensor 214 indicates that the sensor 214 is not operating correctly or in accordance with normal operating conditions. Thus, any creator, user, and/or administrator of the 3D virtual model 202 with appropriate privileges may enter in the desired minimum and maximum values for the threshold level 210 for when an alert 208 should be activated for any particular sensor. For example, if a reading from a sensor 214 exceeds a maximum amount or drops below a minimum amount, an alert 208 may be triggered in the 313 virtual model 202 to alert the user 160 and the screen on the user's computing device 100 may pan to the virtual sensor 204 representing the real world sensor 214 so that the user 160 can see which sensor 214 is not operating correctly. FIG. 7 shows an example of a visual alert 702 (which is in accordance with alert 208) that alerts the user that data obtained from the sensor located at the monitored item 206 in FIG. 7 (e.g., a tank at an oil and gas facility) exceeds normal operating conditions. In one or more non-limiting embodiments, alerts 208 can also be proactively set for the user 160 to take notice of a certain action that may need to be performed on the monitored item 206. FIG. 17 illustrates that the 3D virtual model 202 may be used to perform digital manipulation 1708 or physical manipulation 1710 of one or more functions or other aspects of the monitored item 206, and the alert 208 may be also incorporated to provide a reminder to any of the users 160-162 to do so.

In one or more non-limiting embodiments, the user 160 may be required to first address the issue or repair the issue causing the alert 208 before the alert 208 may be silenced or turned off. Accordingly, in one or more non-limiting embodiments, once the sensor data obtained from actual sensors 214 and digitally represented by the virtual sensors 204 is within normal operating conditions, the alert 208 may be turned off. Accordingly, the user 160 may be required to take steps or actions that will cause the monitored item 206 (e.g., piece of equipment or a condition) to return to normal operating conditions. Alternatively, or additionally, a user 160 may turn off the alert 208 at any time. In one or more non-limiting embodiments, a user 160 may have permission to override the alert 208 for a specific period of time before the alert 208 resumes in the 3D virtual world 202.

The 3D virtual model 202 may allow a user to monitor the set of sensors 214 at the facility 164 in real time or live. In regular intervals, any data obtained from the set of sensors 214 may be stored and updated in the 3D virtual model 202, so that any data displayed with the virtual sensors 204 reflects the most current data or readings. Thus, user 160 may monitor 3D virtual model 202 in order to have a live view 222 of regular, day to day operations at the facility 164.

Additionally, user 160 may use 3D virtual model 202 to view historical sensor data 216. Using the monitored item modeler 172 service, a user is able to rewind and replay any time period of interest to the user 160 to understand a sequence of events 218. A sequence of events 218 may refer to a series of chronological occurrences or instances at facility 164, including the collective stream of data obtained from the real set of sensors 214 at the facility 164 and digitally represented by the virtual sensors 204 in the 3D virtual model 202. Thus, the 3D virtual model 202 allows a user to rewind and replay any recordings of the 3D virtual model 202 to review sensor data for any sensors 204.

This may be particularly important because in a facility 164, there may be many pieces of equipment or other items being monitored by numerous sensors. It may be useful to view historical sensor data 216 when troubleshooting or providing maintenance to the numerous pieces of equipment at the facility 164. Further, when a system failure or problem occurs at a facility 164, it becomes necessary to reconstruct and determine what occurred prior to the system failure or problem. Frequently, these problems cascade from one sensor or another. For example, a drop in pressure along a pipe may be indicative of a leak, causing a buildup of gas in a surrounding room at the facility 164. The user 160 may be first alerted to the pressure drop via a pressure sensor (e.g., sensor 214) in the pipe, followed by an alert for a spike in gas emissions as detected by a real sensor in the surrounding room at the facility 164. Being able to visualize this sequence of events 218 provides the user 160 with the spatial context to intuitively understand what caused the initial failure. Contrast this with the traditional 2D conventional approach that looks at graphs and plots of data, and in which the user would have to manually ascertain what may have occurred at the scene of the event without the benefit of the 3D virtual model 202 or the ability to rewind and replay the 3D virtual model 202 like a video recording and parse through historical sensor data 216 in context with a view of the sequence of events 218 that led up to the failure or malfunctioning and/or one or more alerts 208.

Accordingly, it is a unique component of the one or more embodiments described herein that the monitored item modeler 172 allows a user 160 to go back in time, before the initial failure occurs at the facility 164 and to replay the scene as it unfolded, with a close up view and understanding of how the data on the virtual sensors 204 changed based on the actual readings of the set of sensors 214 at the facility 164. The scene may be replayed on the 3D virtual model 202 in real time as it happened or discreetly through the sequence of alerts 208 that were triggered when a threshold level 210 for each virtual sensor 204 to be triggered is reached.

In one or more non-limiting embodiments, all the sensor data fed to the 3D virtual model 202 and obtained from the actual set of sensors 214 at the facility 164 may be stored using data storage 182 and/or database 184 as shown in FIG. 1 and/or in the memory 120 of the computing device 100. This replaying of the scene of a system failure or problem can take place as many times as needed for initial triage or subsequent analysis.

There may be many types of documentation and/or reports the user 160 may be required to prepare for facility 164. The documentation and/or reports may be needed for various purposes, including, but not limited to, internal auditing of the facility 164, insurance, litigation, or various regulatory agencies, in order to comply with local or federal regulations. Further, the documentation and/or reports may be useful for training and internal management with respect to the operations of one or more monitored items 206 and/or the facility 164 and/or sensors 214. The user 160 may choose to take snapshots or segments or include entire recordings of 3D virtual model 202 as part of these documents and/or reports to further illustrate the operating conditions at the facility 164 at any point in time.

Figure 11:
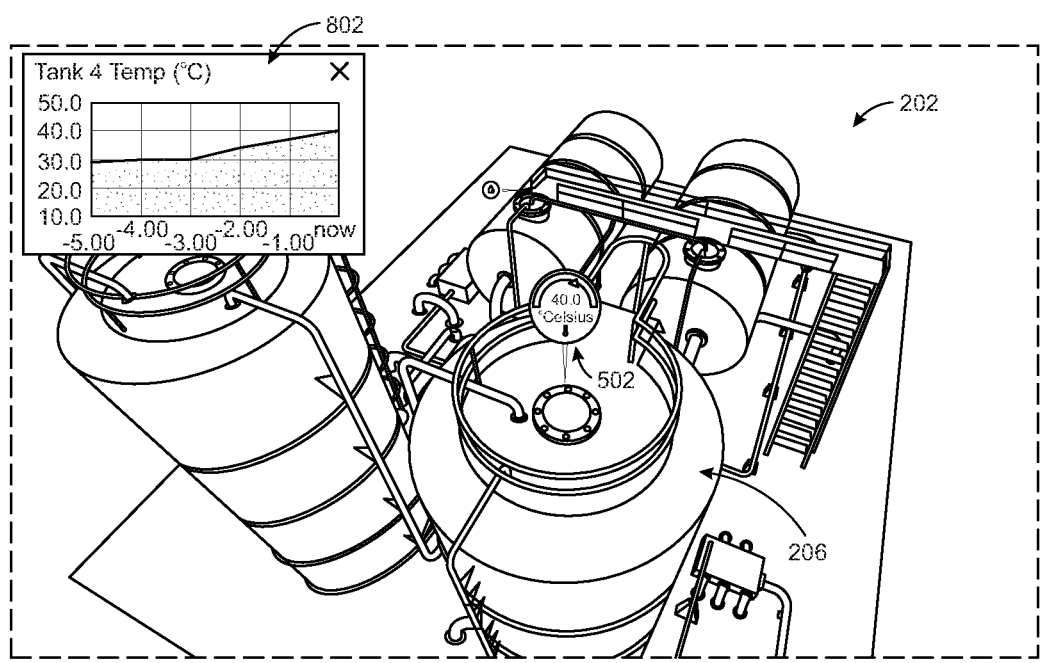
FIG. 11 is a pictorial illustration of another data visualization viewable on the 3D virtual model in accordance with an illustrative embodiment.

In one or more non-limiting embodiments, in addition to the above, the 3D virtual model 202 may further include various data visualizations 212. Data visualizations 212 may be either two-dimensional or three-dimensional representations of sensor data. Data visualizations 212 may depict and display a collection of sensor data over time (or over another variable) and be presented to the user 160 in the 3D virtual model 202. For example, FIG. 11 shows an example of a data visualization 212 (e.g., data visualization 802), which is a graph of the temperature of the interior contents of a tank at an oil and gas facility and depicts the changes in temperature in time based on the recorded sensor data obtained from the facility 164 and reflected in the virtual sensors 204 on the 3D virtual model 202.

Data visualizations 212 may be any type of graph, chart, table, plot, gauge, or other type of display that graphically depicts sensor data. In one or more non-limiting embodiments, data visualization 212 may be a heat map. Advantageously, this heat map may be three dimensional to help the user understand and visualize the heat map with additional animation and visual effects to further visualize the heat map.

Data visualizations 212 displayed in the 3D virtual model 202 may include a presentation of information about the sensor data over time or over another variable and for any metric measured by the one or more set of sensors 214 and reproduced as virtual sensors 204 in the 3D virtual model 202. Data visualizations 212 may combine multiple data from multiple virtual sensors 204. Further, data visualizations 212 may include metadata about the set of sensors 214 at the facility 164, such as, but not limited to, the model and make of the sensors 214, when they were last serviced or maintained and by whom (e.g., see FIG. 11 and FIG. 14). In one or more non-limiting embodiment, the metadata about the sensors 214 at the facility 164 may be obtained from third party databases owned or accessible by the user 160. These data visualizations 212 may appear automatically to the user 160 or may be selected by the user 160 upon selection by the user 160 via one or more interfaces available to the user 160 on the 3D virtual model 202.

Any of the data visualizations 212 may be provided from the 3D virtual model 202 in three dimensional form, including the heat map mentioned above. Other 3D data visualizations 212 may include fluid level or flow direction among many others. For example, in one non-limiting embodiment, the data visualization 212 may include bubbles animating in the direction of flow. Additionally, in some non-limiting embodiments, data visualizations 212 may include the combination of two-dimensional graphical representations alongside of three-dimensional graphical representations or either format may be made available and separately selectable by the user.

Further, data visualizations 212 may include metadata or information about the set of sensors 214, and/or may include metadata or information about the piece of equipment or another monitored item 206. For example, the data visualization 212 may include data regarding the model and make of one or more tanks shown in the 3D virtual model 202 in FIGS. 3-12. This type of storing of metadata for the monitored items 206, as well as for the sensors 214, may be helpful for asset management and tracking at the facility 164.

In addition to data visualizations 212, in one or more non-limiting embodiments, 3D virtual model 202 may be able to reflect digitally the weather conditions at any time at the facility 164. For example, if it is raining on a particular day, the 3D virtual model 202 may include virtual rain or at least the outside temperature and a symbol of rain in the 3D virtual model 202. Other methods of displaying temperature may also be used.

Accordingly, monitored item modeler 172 provides multiple benefits and advantages over conventional two dimensional plots of information that contain a collection of sensor data. First, monitored item modeler 172 has a three dimensional virtual model 202 that is a highly accurate, substantially exact rendering of all or a portion of facility 164, which contains virtual representations 204 of any sensors 214 of interest to the user 160. The three dimensionality of the replica, i.e., 3D virtual model 202, allows the user 160 to view the one or more monitored items 206 and/or facility 164 from any location and have a greater understanding of the equipment, structure, and layout of the one or more monitored items 206 and facility 164 where the set of sensors 214 are located. Further, in one or more non-limiting embodiments, the set of sensors 214 are represented by virtual sensors 204 and placed in the same or approximately the same position and location in the 3D virtual model 202 as in reality at the facility 164 and with the same monitored items 206.

Further, the user can interact with the 3D virtual model 202 fully and perform 360 degree rotations or other multi-angle rotations of the 3D virtual model 202 (in one or more non-limiting embodiments) to view any virtual sensor 204 on the 3D virtual model 202 from multiple angles. Additionally, 3D virtual model 202 allows the user 160 to monitor the one or more monitored items 206 and facility 164 and the set of sensors 214 through the virtual sensors 204 live. Accordingly, as the data from the set of sensors 214 at the facility 164 is updated into the sensor displays shown in the 3D virtual model 202 for each virtual sensor 204, the user 160 is able to view all of the updates on the 3D virtual model 202 regarding the sensors 214 for the one or more monitored items 206 and/or facility 164. If the virtual sensor 204 receives a data reading or input that exceeds a threshold level 210 (e.g., whether it exceeds a maximum or is below a minimum level or both), an alert 208 may fire for that virtual sensor 204 and the user 160's attention directed to the virtual sensor 204 that has the triggered alert 208. This directly draws the user 160's attention to the one or more virtual sensors 204 having a problem or an issue in their normal operating conditions and the user 160 can take steps to fix or repair the issue at the facility 164 or to otherwise notify those who can.

Additionally, the user 160 may replay any past stored recordings or files of the 3D virtual model 202 to show the user 160 the readings of the virtual sensors 204 over a desired period of time so as to understand what happened by analyzing the sequence of events 218 at the facility 160 that caused the alerts 208 to trigger.

As shown above, the monitored item modeler 172 and 3D virtual model 202 allows enhanced and improved monitoring of equipment and other items at the facility 160. Further, monitored item modeler 172 and 3D virtual model 202 may help minimize loss due to accidents and incidents, as well as provide for improved response time or immediate response from responsible parties in event of a failure or accident. Accordingly, monitored item modeler 172 and 3D virtual model 202 may allow for optimal decision making for those individuals responsible for the facility 164.

In one or more non-limiting embodiments, it may be possible and necessary to grant different access rights and permissions for users 160 of 3D virtual model 202. Accordingly, there may be some users 160 who are only granted partial access and others who have greater permission or control and editing rights within 3D virtual model 202. Further, in some cases, one user 160 may be viewing the 3D virtual model 202 in order to monitor the facility 164 in real time or live, while another user may simultaneously be reviewing past historical sensor data 216, by rewinding and replaying a stored version of the 3D virtual model 202. Thus, each user 160 may have different versions of the 3D virtual model 202.

Turning to FIG. 3, FIG. 3 is a pictorial illustration of an example 3D virtual model 202. 3D virtual model 202 in FIG. 3 and throughout the present description is in accordance and functions the same as 3D virtual model 202 discussed above with respect to FIGS. 1-2.

As shown in FIGS. 3-12, 3D virtual model 202 is a replica of an oil and gas facility (e.g., facility 164). At the oil and gas facility 3D virtual model 202 as shown in FIGS. 3-12, there are numerous virtual sensors 204 that reflect data including values or variables for one or more monitored items 206 and/or one or more set of sensors 214. The example monitored items 206 shown in FIG. 3 are tanks that are present at the oil and gas facility. The virtual sensors 204 shown in FIGS. 3-12 are virtual sensors that represent actual sensors (e.g., set of sensors 214) that would be found at the actual oil and gas facility with these monitored items 206.

Turning to FIG. 3, the position and location of each sensor 204 in FIG. 3-FIG. 12 are indicated by icon 305. Each icon 305 may include a symbol 306 that represents a variable, value, metric, and/or function of each virtual sensor 204. For example, for the sensors 204 in FIG. 3 that measure primarily fluid levels, the symbol 306 for the corresponding icon 305 may be a droplet or some other indication of liquid to indicate fluid level measurements or volume are taken and reflected by this sensor 204. Additionally, for other sensors 204 that measure temperature, the symbol 306 for the corresponding icon 305 may be a thermometer to indicate that temperature measurements are taken and reflected by this sensor 204. One of ordinary skill in the art will understand that other icons may be used, and that these are merely examples.

The symbols 306 associated with the icons 305 will provide a visual indication to the user 160 about the function of each sensor 204 and the type of data obtained by the sensor 204. In one or more non-limiting embodiments, the 3D virtual model 202 may further include an index or listing of all of the icons 305 and symbols 306 so that a user may better understand the role of and meaning behind the icons 305 and symbols 306.

Figure 4:
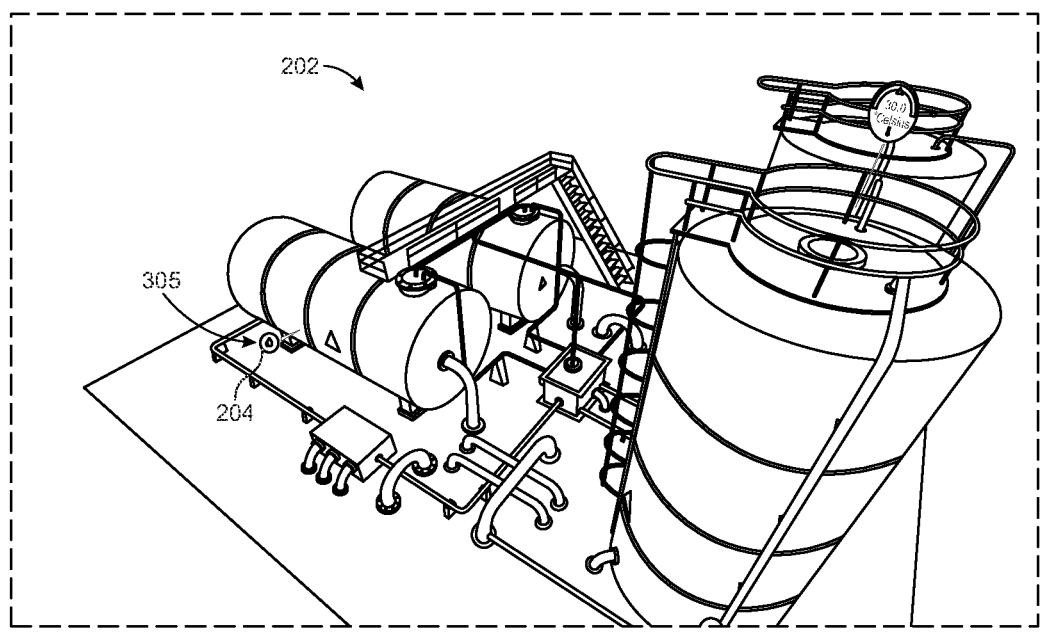
FIG. 4 is a pictorial illustration of another view of a 3D virtual model of monitored items and associated sensors at a facility in accordance with an illustrative embodiment.

FIG. 4 is another view of the oil and gas facility shown in FIG. 3. As noted above, the user 160 is intended to be able to navigate through the 3D virtual model 202 and view the facility in the 3D virtual model 202 from multiple angles and perspectives. In one or more non-limiting embodiments, the user 160 can rotate, pan, flip, zoom in, zoom out, or otherwise interact and engage with the 3D virtual model 202 as displayed on the user 160's computing device 100 on any screen. The 3D virtual model 202 may be fully rotatable in a 360 degree direction and be a highly accurate reflection of the facility 164 in one or more non-limiting embodiments. The user 160 may use his or her input devices 108 and output devices 110, as discussed above with respect to FIG. 1, on computing device 100 to interact with the 3D virtual model 202.

Figure 5:
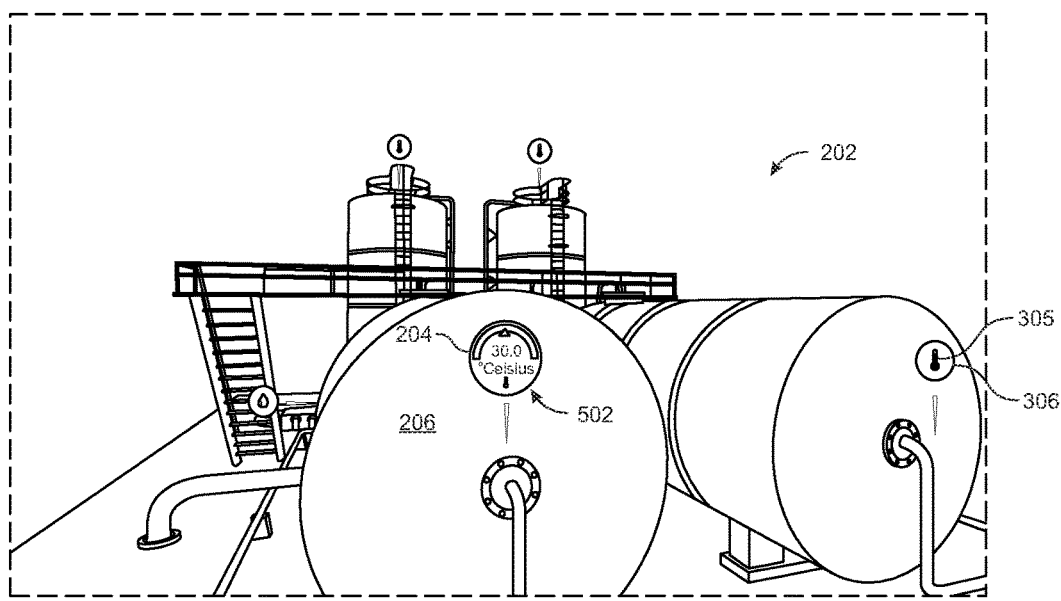
FIG. 5 is a pictorial illustration of a sensor display in a 3D virtual model of monitored items at a facility in accordance with an illustrative embodiment.
Figure 6:
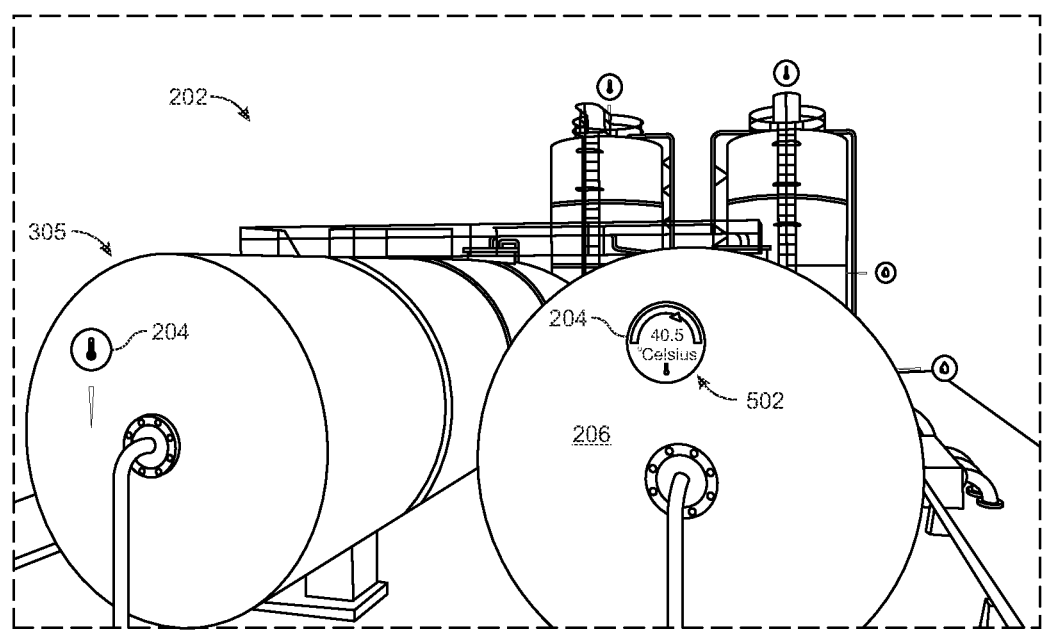
FIG. 6 is a pictorial illustration of another sensor display in a 3D virtual model of a facility in accordance with an illustrative embodiment.

FIG. 5 and FIG. 6 provide pictorial illustrations of an example of a sensor display, such as sensor display 502, that may appear or be associated with each sensor 204 in the 3D virtual model 202. Sensor display 502 may provide display of the current data or reading for the virtual sensor 204, whereby the data is obtained from the data or readings provided by the real set of sensors 204 at the actual facility 164. The sensor display 502 can include other visual indications regarding the metric measured, such as symbols of temperature, volume, or other conditions or metrics measured by the sensor 204.

As shown in FIGS. 5-6, the sensors 204 are located near or on the monitored items 206, which in these examples shown in FIGS. 5-6, are tanks at the oil and gas facility 164 that are digitally represented in the 3D virtual model 202 in the monitored item modeler 172 application and/or web service.

In the same images in FIGS. 5-6, it is possible to see icons 305 and symbols 306 of other virtual sensors 204 located within the same viewpoint. The user 160 can scroll over or otherwise select any sensor 204 to view the sensor display 502 for each sensor 202, Accordingly, in one or more non-limiting embodiments, each sensor 204 may include an icon 305, a symbol 306, and a sensor display 502.

Turning to FIG. 7, FIG. 7 provides an example of a visual alert 208 and is labeled as alert 702 in FIG. 7 that may be provided to a user 160 for a virtual sensor 204. The visual alert 702 may be displayed in bright colors, such as a bright red and/or may flash in some embodiments so as to attract the attention of the user 160 monitoring the 3D virtual model 202 and/or the actual sensors 212. As noted above, when a data value of a sensor 204 exceeds the threshold level 210 set for the actual sensor 204, the 3D virtual model 202 may alert the user 160 by one or more alerts 208 as shown in FIG. 2 and described above. These alerts 208 may be audio alerts, visual alerts, or a combination thereof. Visual alert 702 shown in FIG. 7 is an example of an alert 208. In the scenario depicted in FIG. 7, the sensor 204 associated with the visual alert 702 has a sensor reading that does not reflect normal operating conditions because the sensor data for this sensor 204 may exceed or be below a threshold level 210. Accordingly, in one or more non-limiting embodiments, the visual alert 702 may include a highlighted circle around the sensor display 502. Further, a sound or noise may be triggered to draw the user's 160 attention even further to the triggered alarm or alert 702. Additionally, the 3D virtual model 202 may be programmed to automatically pan to the most recent triggered alert 702 so that the user 160 can easily view which sensor 204 needs attention. These measures may help the user 160 quickly troubleshoot and ascertain a situation before it cascades and escalates into a total system failure or disaster at the actual facility 164. So, for the tank, which is an example of monitored item 206, in the 3D virtual model 202 shown in FIG. 7, a sensor 204 is located on or near the tank to measure the temperature of the tank and/or its interior contents. When the temperature measurement obtained from the actual sensor 214 and reflected by the virtual sensor 204 is too high (or low), the visual alert 702 (and other types of alerts such as a sound alert) will be triggered to alert the user 160 to this event.

Further, by immediately panning to the alerting sensor 204, a user 160 can easily target which sensor 204 or sensors 204 needs immediate attention. This may be particularly helpful because a facility 164 may include numerous sensors 214, and it may be difficult to determine which sensor 214 and monitored item 206 needs immediate attention.

It is noted that a user 160 may later replay this sequence of events 218 with respect to the visual alert 702 of the sensor 204 at the oil and gas facility shown in FIG. 7. The user 160 may need to prepare one or more reports for purposes of documenting what happened at the facility 164. The user 160 may select a segment of the video or recording of the 3D virtual model 202 and include in the report. Accordingly, the user 160 may utilize 3D virtual model 202 for purposes of internal reporting, auditing, insurance reports, litigation, or any other purpose.

Figure 8:
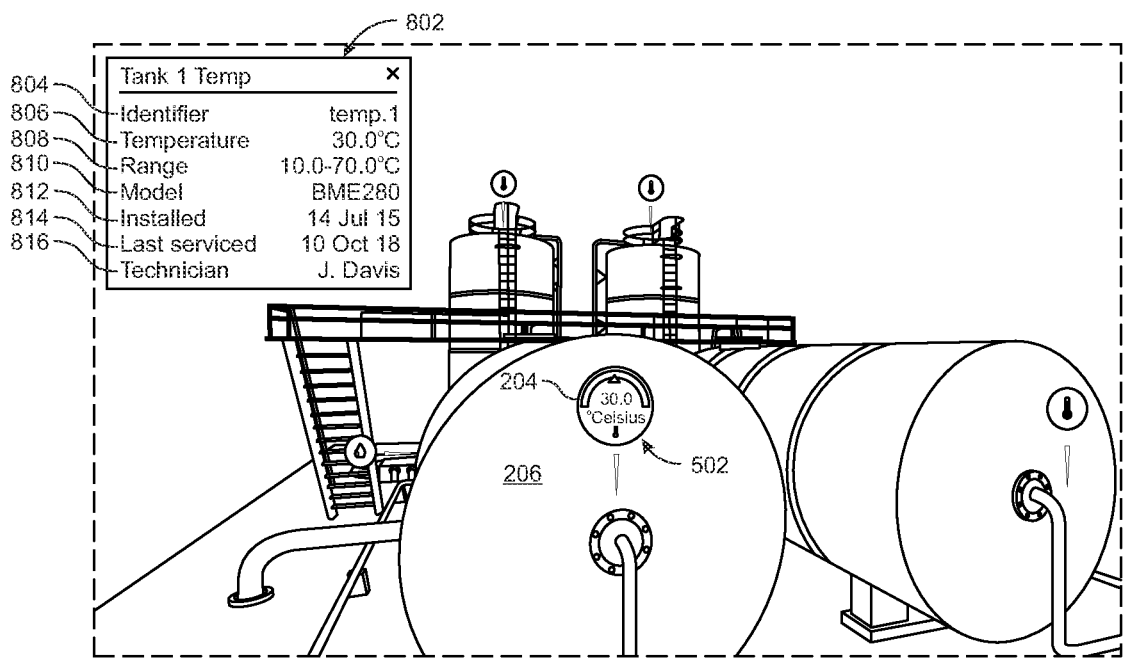
FIG. 8 is a pictorial illustration of a data visualization provided in a 3D virtual model with relevant data for one or more monitored items at a facility in accordance with an illustrative embodiment.

Turning to FIG. 8, FIG. 8 shows an example of a data visualization for one or more metrics measured by a sensor at a facility and reflected digitally in the 3D virtual model. In FIG. 8, the data visualization 802 may be in accordance with data visualization 212 as described above with respect to FIG. 2. Data visualization 802 is an example of a table or chart that may be useful, because data visualization 802 includes additional information or metadata about a sensor 204. For example, data visualization 802 may include helpful information about an actual sensor 214 which has a virtual sensor 204 depicted and displayed in the 3D virtual model 202 in monitored item modeler 172.

In one or more non-limiting embodiments, each virtual sensor 204 may have an identifying label 804, which is an assigned label or title for the particular sensor 204. Further, data visualization 802 may include the most current data value or reading 806 for the sensor 204 as well as an average range 808 of data values for the particular sensor 204. Data visualization 802 may further include a model number or type 810 for the sensor 204, as well as the installation date 812. Further, the data visualization 802 may further include a last serviced data 814 and name of the technician 816. One of ordinary skill in the art will understand that other data visualizations 802 may include some of these elements or additional elements.

Figure 9:
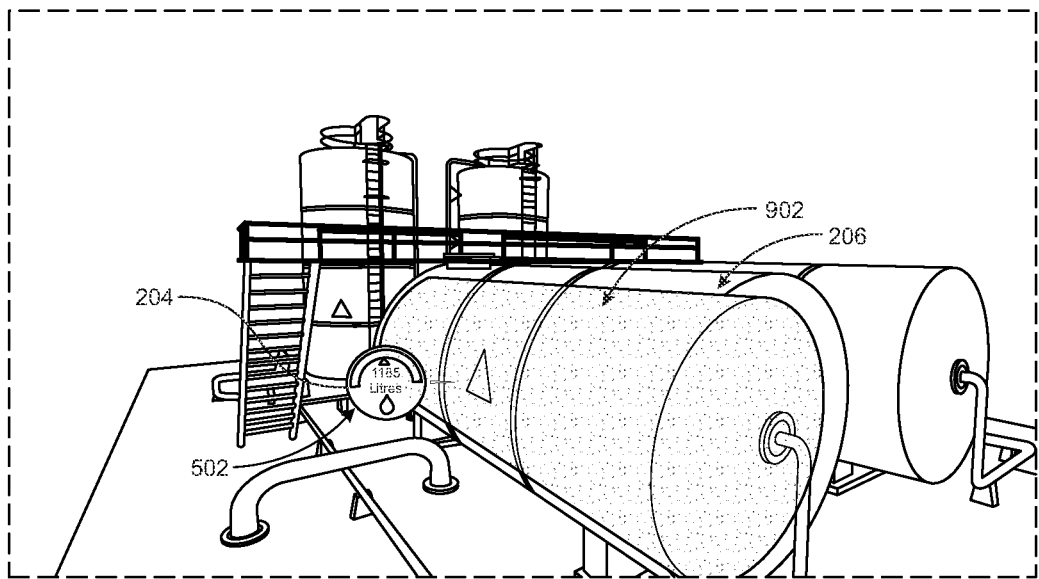
FIG. 9 is a pictorial illustration of an interface on the 3D virtual model showing the interior contents of a monitored item at a facility in accordance with an illustrative embodiment.

Turning to FIG. 9, FIG. 9 is a pictorial illustration showing how 3D virtual model 202 may further include a digital representation or visualization of interior contents 902 of a monitored item 206. For example, as shown in FIG. 9, the interior contents 902 of the tank (e.g., monitored item 206) shown in this 3D virtual model 202 may be a type of fluid at a certain level. The 3D virtual model 202 may provide an x-ray view or interior view of this tank so that the user can see the level of the fluid inside the tank. The sensor display 502 associated with the monitored item 206 (i.e., tank) indicates the data reading associated with the volume of the fluid within the monitored item 206 (i.e., tank).

Figure 10:
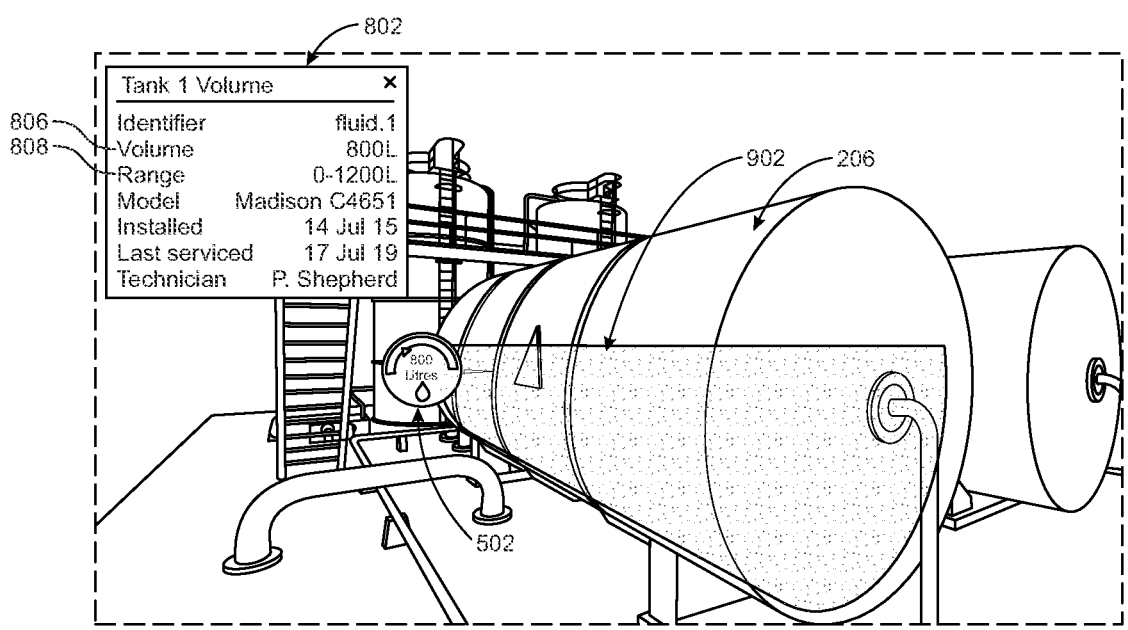
FIG. 10 is a pictorial illustration of an interface on the 3D virtual model showing the interior contents of a monitored item and a data visualization for the monitored item in accordance with an illustrative embodiment.

Turning to FIG. 10, FIG. 10 is also a pictorial illustration of the fluid level of the monitored item 206, i.e., a tank, at the oil and gas facility, whereby the fluid level is lower compared to the previous level shown in FIG. 9. Further, FIG. 10 includes another example of a data visualization 802 that includes relevant metadata or information for this sensor 204. The data visualization 802 shown FIG. 10 includes metadata related to fluid levels for this particular sensor 204, including current readings for the volume 806 and average range of volume 808 of the fluid 902 as provided by one or more actual sensors 214 and communicated to the virtual sensors 204.

Figure 12:
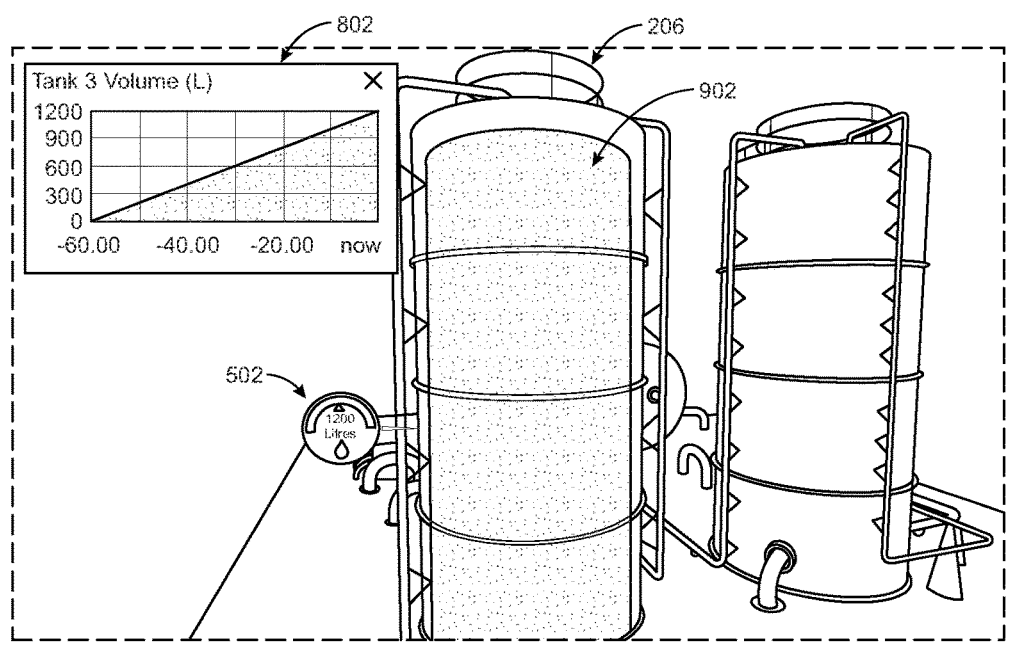
FIG. 12 is a pictorial illustration of the 3D virtual model and an interior view of a monitored item in accordance with an illustrative embodiment.

FIG. 11 shows another example of a type of data visualization 802 that may be provided for a particular sensor 204. In FIG. 11, the data visualization 802 shown is a graph of temperature values as they change over time for sensor data obtained from a particular sensor 204. FIG. 12 shows another example of a data visualization 802, whereby the data visualization 802 in FIG. 12 is a graph of fluid volumes over time for the interior contents 902 of the fluid in the tank (e.g., monitored item 206) in FIG. 12. Combining these data visualizations 802 (e.g., data visualizations 212 in FIG. 2) that include important sensor data with the 3D virtual model 202 and the interior view of the contents 902 of a monitored item 206 provides a very clear and accurate picture to the user 160 of how any monitored items 206 are performing at the facility 164. A user 160 may easily use these snapshots or segments from the 3D virtual model 202 in one or more reports or other type of documentation for internal auditing, litigation, troubleshooting, maintenance, insurance, regulatory agencies, or for any other reason. Further, the entire 3D virtual model 202 may be made accessible to any relevant users 160 who may rewind and replay the stored versions of the 3D model 202 to view directly on a computing device. Accordingly, there may be one or more versions of the 3D model 202 which may be helpful to show how a monitored item 206 looked at any period or point in time as well as the facility 164.

Turning to FIGS. 13-16, FIGS. 13-16 are pictorial illustrations of another facility 164 for which a 3D virtual model 202 has been created using monitored item modeler 172. The facility 164 depicted in FIGS. 13-16 is a winery 1306 that is located underground. In the winery 1306, there are numerous sensors 204 that measure several different variables or metrics that are relevant to the proper maintenance and operation of fermentation of wine. The sensors 204 in FIGS. 13-16 measure various metrics and each include their own respective sensor displays 502 that display the current reading or sensor data for each particular sensor 204.

In FIGS. 13-16, clockwise from the top, the illustrated sensors 204 are used to measure the temperature, carbon dioxide level, ultraviolet light, noise, air quality, pressure, humidity, and level of ambient light associated with various pieces of equipment in the winery 1306. These are examples of sensors 204 that may be used to measure one or more variables at a facility 164 like the winery 1306, and one of ordinary skill understands that additional or fewer sensors 204 may be used.

The sensors 204 may be grouped together, in one or more non-limiting embodiments, in a sensor cluster 1302. The sensor cluster 1302 may have a special group icon, such as group icon 1304, that indicates a group of sensor displays 502 are illustrated together and associated with this group icon 1304. In one or more non-limiting embodiments, sensor clusters 1302 and group icons 1304 may be used for all sensors monitoring the same piece of equipment. Accordingly, since it is important to measure the temperature, carbon dioxide level, ultraviolet light, noise, air quality, pressure, humidity, and level of ambient light for the equipment in the winery 1306, these would all appear together in one or more non-limiting embodiments. The clustering of the sensor data may help the user 160 easily view the relevant sensor data for multiple sensors 204. Alternatively, or additionally, there may be individual icons and symbols for each sensor 204, such as icons 305 and symbols 306 shown in FIGS. 3-12.

Figure 14:
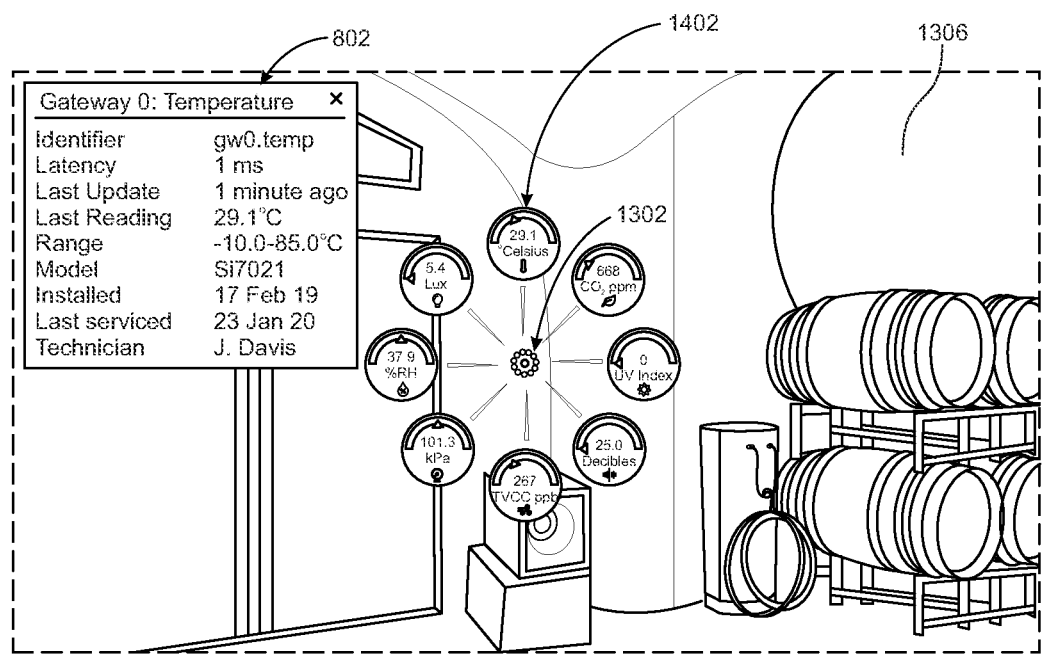
FIG. 14 is a pictorial illustration of a data visualization of a 3D virtual model for another facility in accordance with an illustrative embodiment.

FIG. 14 is an illustration of another data visualization 802 that may appear with sensor cluster 1302 with relevant information about a particular sensor, i.e. sensor 1402. In FIG. 14, the data visualization 802 chart includes relevant sensor data about sensor 1402, which measures the temperature of a piece of equipment in winery 1306. It is noted that some sensors 204 may measure these variables for the air in the winery 1306 itself and does not have to be tied directly to a piece of equipment.

Figure 15:
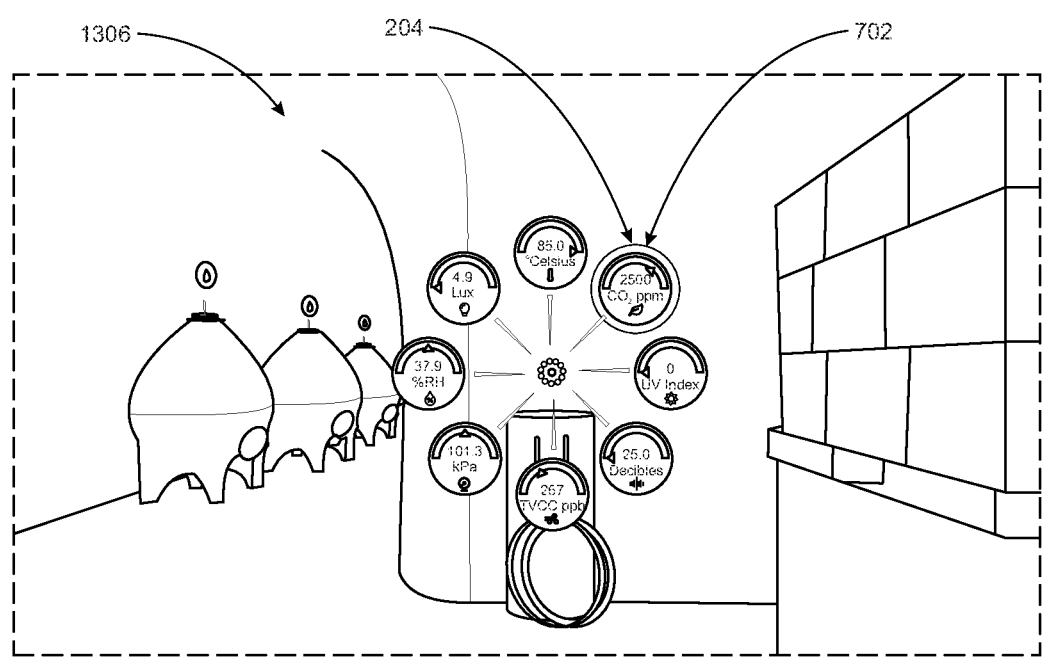
FIG. 15 is a pictorial illustration of a visual alert of a sensor in the 3D virtual model in accordance with an illustrative embodiment.

FIG. 15 is an illustration of an alert 702 that is triggered and displayed to user 160 when the sensor data associated with a sensor in the winery 1306 is not in accordance with normal operating conditions. As noted above, the 3D virtual model 202 can pan to the particular sensor 204 and visual alert 702 so that the user 160 is presented with the correct sensor 204 that needs immediate attention. As noted above, other alarms, such as sound alarms or other text may appear to the user 160 on the 3D virtual model 202. By activating the alert 702, the user 160 may attempt to correct the situation or failure. In this case, the level of carbon dioxide is too high in the winery 1306 or for a particular piece of equipment (e.g., monitored item 206). Accordingly, a user may turn on an exhaust fan to help lower the level of carbon dioxide in the winery 1306 and return to normal operating conditions. In one or more non-limiting embodiments, the alert 702 may turn off when the updated data or readings for the virtual sensor 204 indicates that conditions have returned to normal operating conditions. Alternatively, the user 160 may be enabled to turn off or stop the alert 702 temporarily for a period before the alert 702 resumes.

Figure 16:
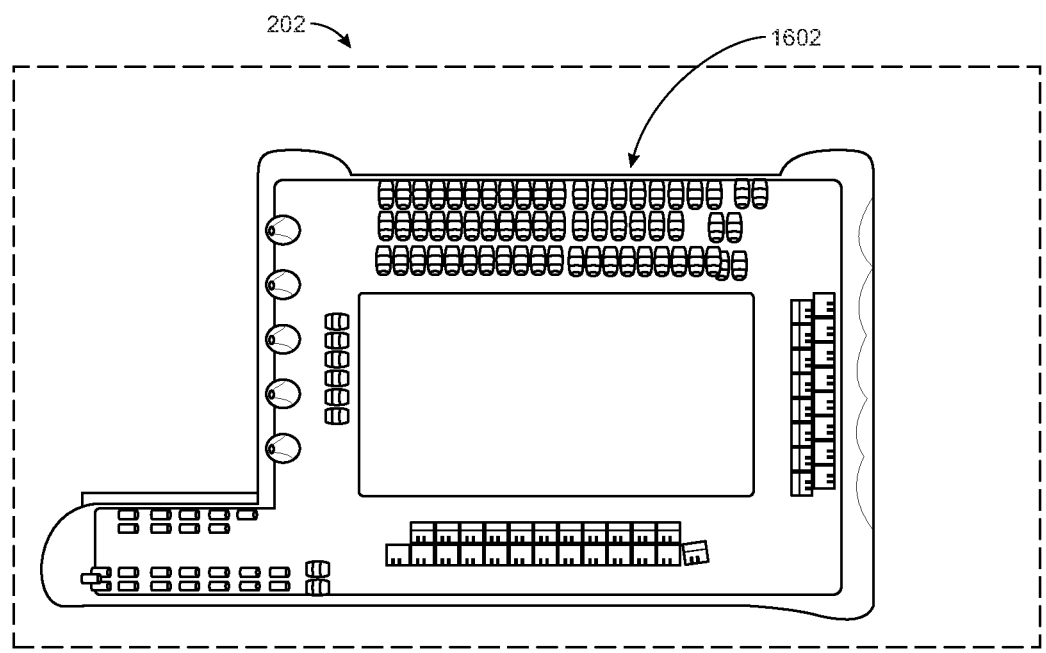
FIG. 16 is a pictorial illustration of a bird's eye view of the 3D virtual model in accordance with an illustrative embodiment.

Turning to FIG. 16, in one or more non-limiting embodiments, the 3D virtual model 202 may provide a comprehensive view 1602 of the winery 1306 (e.g., facility 164). "Comprehensive view" as used herein may interchangeably be used with a "bird's eye view" whereby the user 160 can easily pan to or zoom in to any relevant parts or areas within the virtual model 202 of the winery 1306 of interest.

FIGS. 17-28B show additional functions and features for monitored item modeler 172 and 3D virtual model 202. Referring to FIG. 17, FIG. 17 is a block diagram displaying the components of monitored item modeler 172, including the components illustrated in FIG. 1. Additionally, monitored item modeler 172 is configured to provide reciprocal rendering 1702 of the 3D virtual model 202. Reciprocal rendering 1702 may imply many various functions and meanings. Reciprocal rendering 1702 may imply that the 3D virtual model 202 on the first user 160 computing device 100 is driving or controlling particular actions, in some cases, (e.g., IOT control system manipulation 1706) and visual presentation via extended reality 1704 of the digital twin model 1712 on the second user 162's computing device 100. The digital twin model 1712 is in turn in communication via one or more signals or other aspects with the monitored item 206 and/or facility 164 as shown in FIG. 17.

Figure 19:
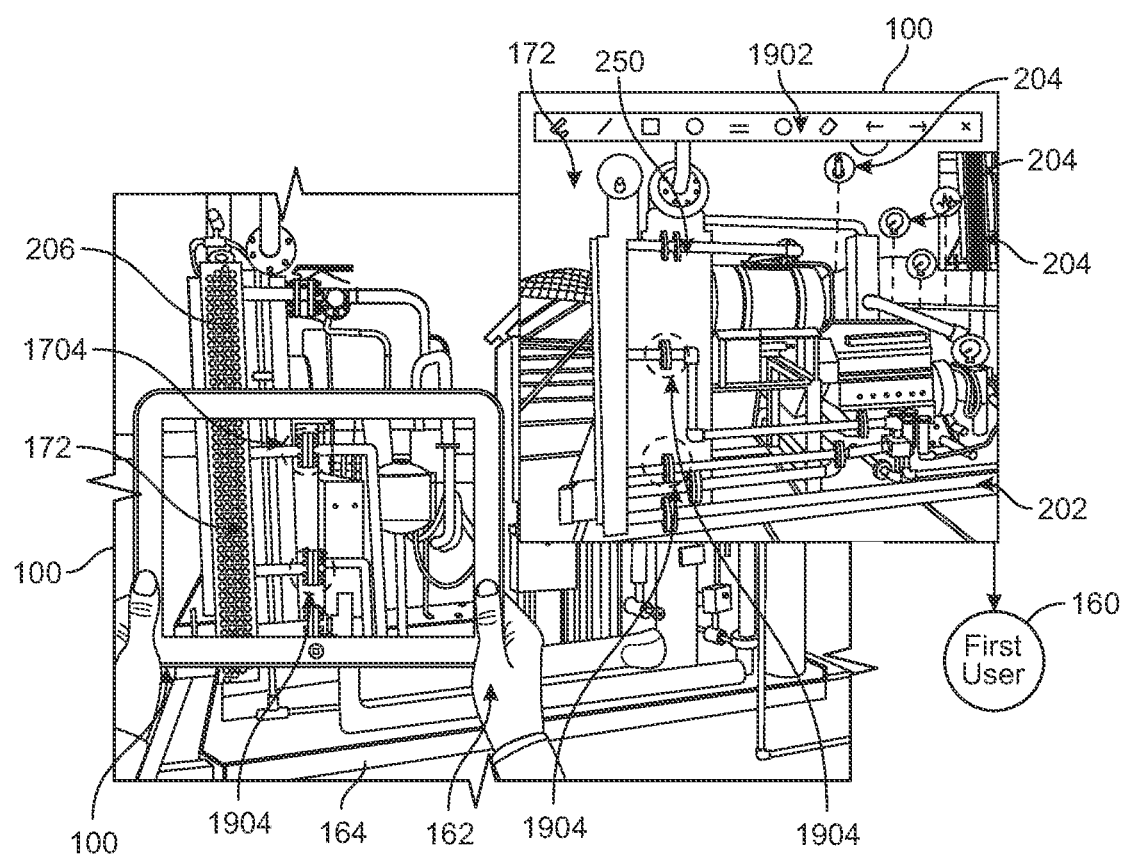
FIG. 19 is a pictorial illustration of an example of a 3D virtual model and graphical manipulation on a monitored item whereby the user is physically adjacent to the monitored item at a facility.
Figure 20:
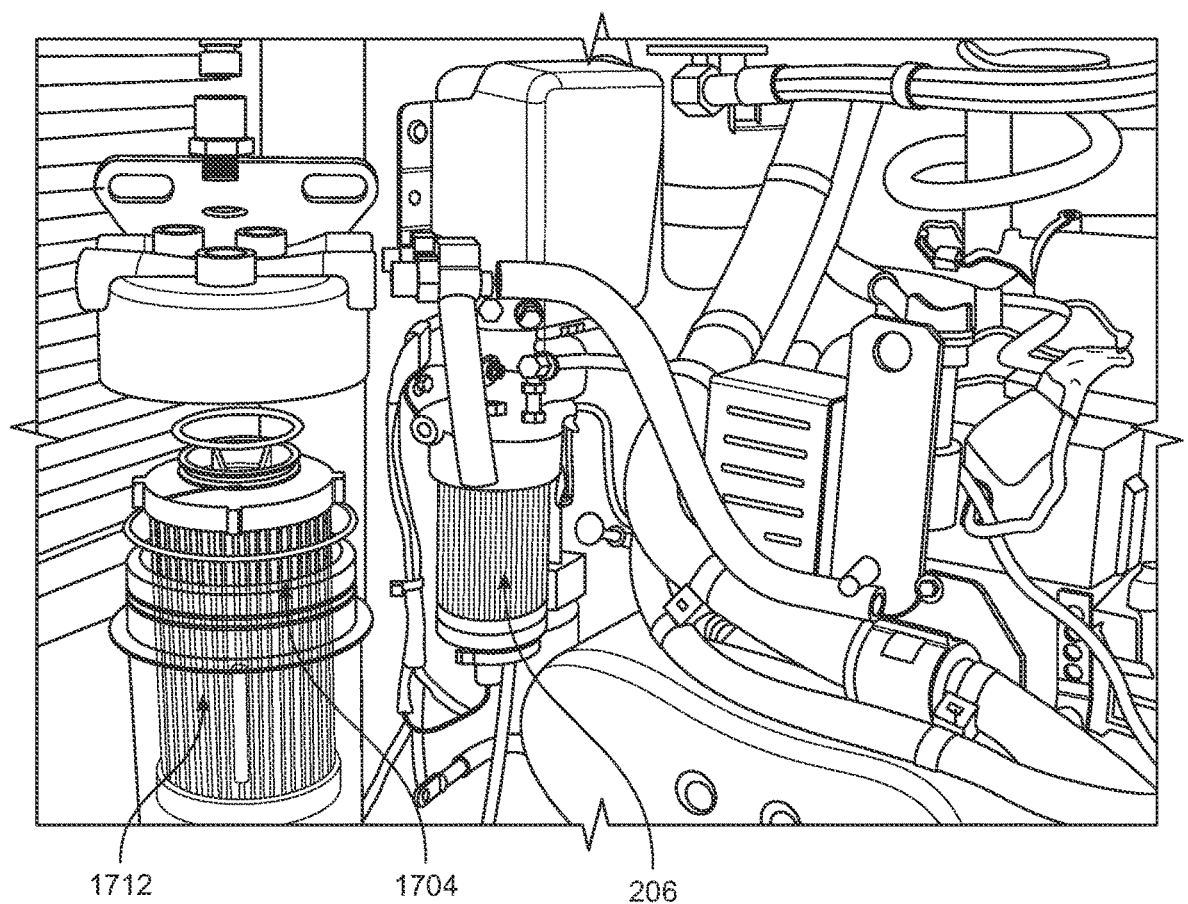
FIG. 20 is a pictorial illustration of a monitored item with a 3D virtual model represented physically adjacent to the monitored item as well as an exploded view of the 3D virtual model.
Figure 21:
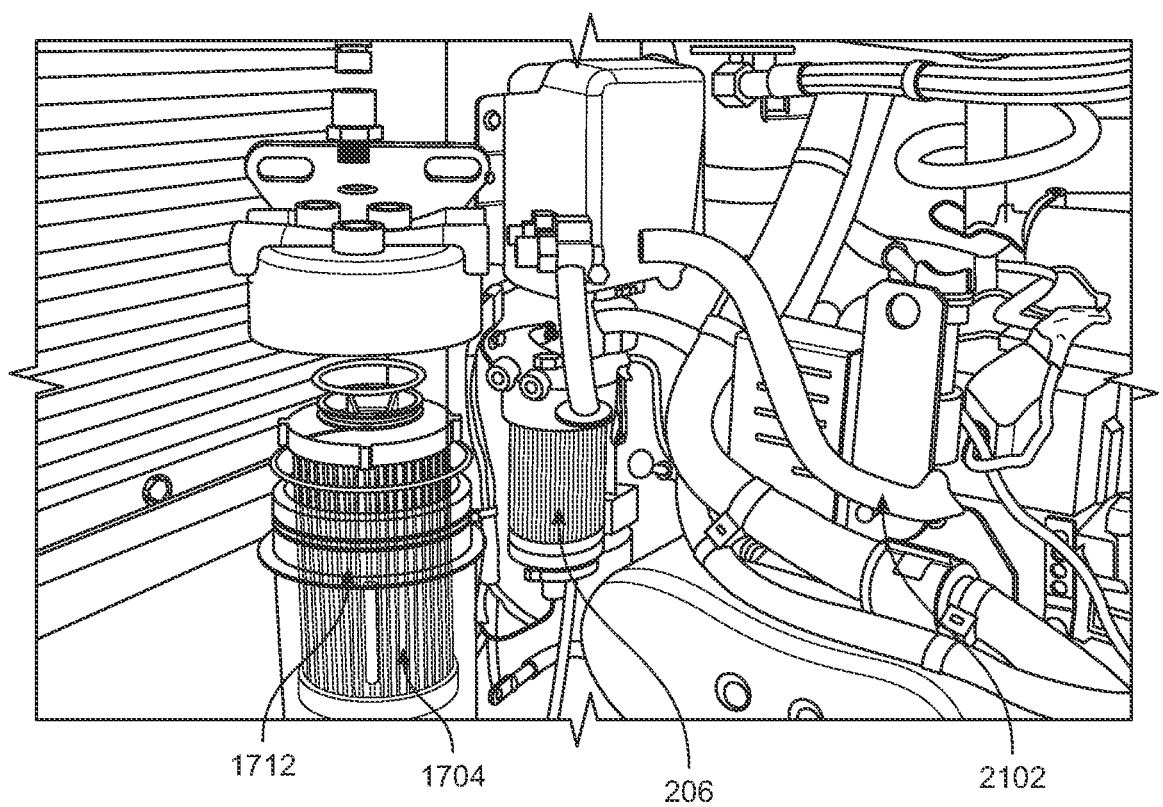
FIG. 21 is a pictorial illustration of the monitored item from FIG. 20 and examples of reciprocal rendering of graphical manipulation on the 3D virtual model as well as on the monitored item.

In some instances, reciprocal rendering 1702 means that the 3D virtual model 202 may have a twin 3D virtual model 1712 as displayed on a second user's 162 computing device 100 that can be displayed adjacent to a physical asset (i.e., monitored item 206), as shown in FIG. 20 and FIG. 21. In other instances, reciprocal rendering 1702 may mean that any annotations made by a first user 160 in the 3D virtual model 202, including highlighting, notes, shapes, different views, or any type of markup made on the 3D virtual model 202 may be shown to be illustrated directly over and onto a monitored item 206 from the computing device 100 of the second user 172 who may be physically near or physically adjacent to the monitored item 206, which is illustrated in FIGS. 19, 20-21, and 23. Reciprocal rendeting 1702 may further mean that the 3D virtual model 202 may have a twin 3D virtual model 202 that may be projected in a local environment, e.g., local environment 2402 as shown in FIG. 24, of the second user 162 (or any other subsequent number of additional users).

Figure 28A:
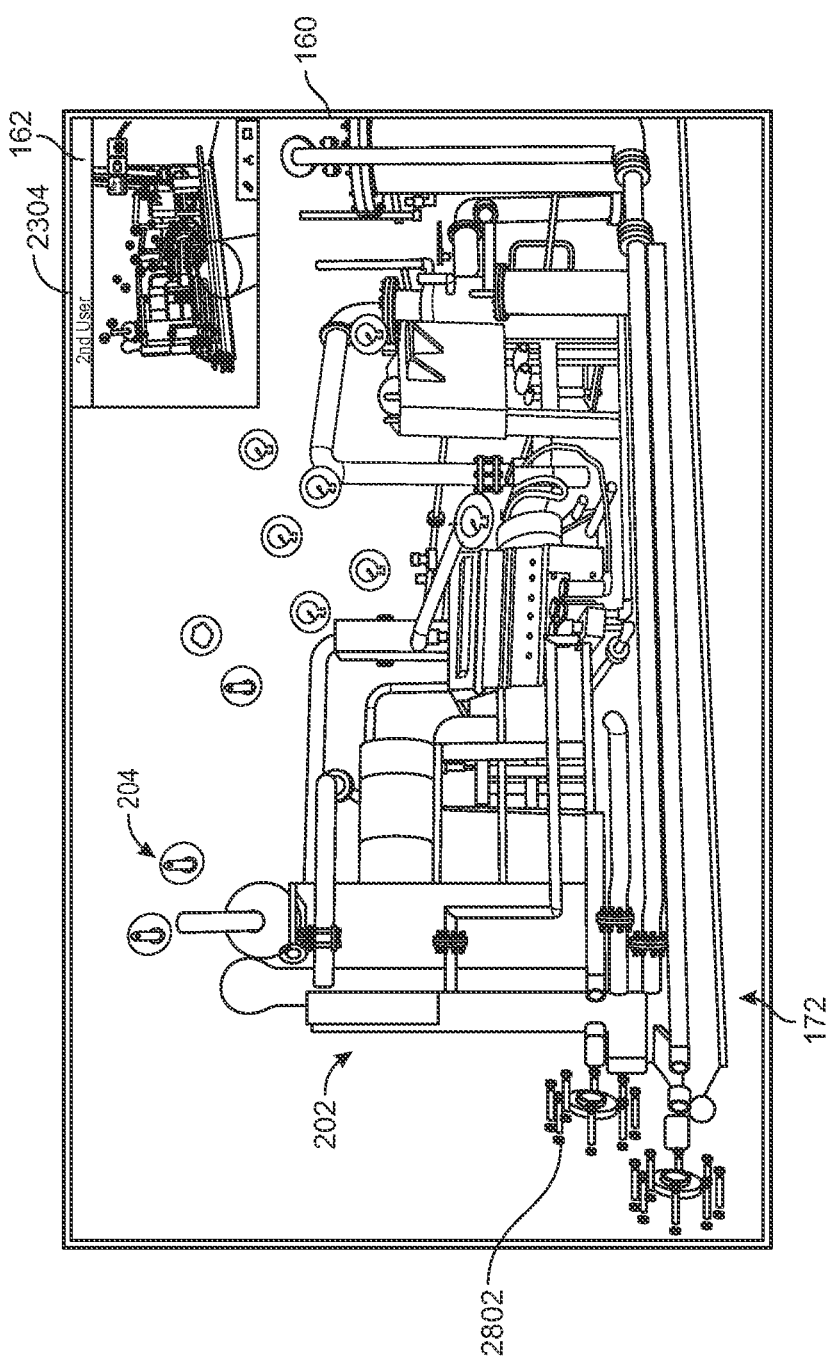
FIG. 28A is a pictorial illustration of a 3D virtual model being controlled by a first user and exploded views being provided in the 3D virtual model.
Figure 28B:
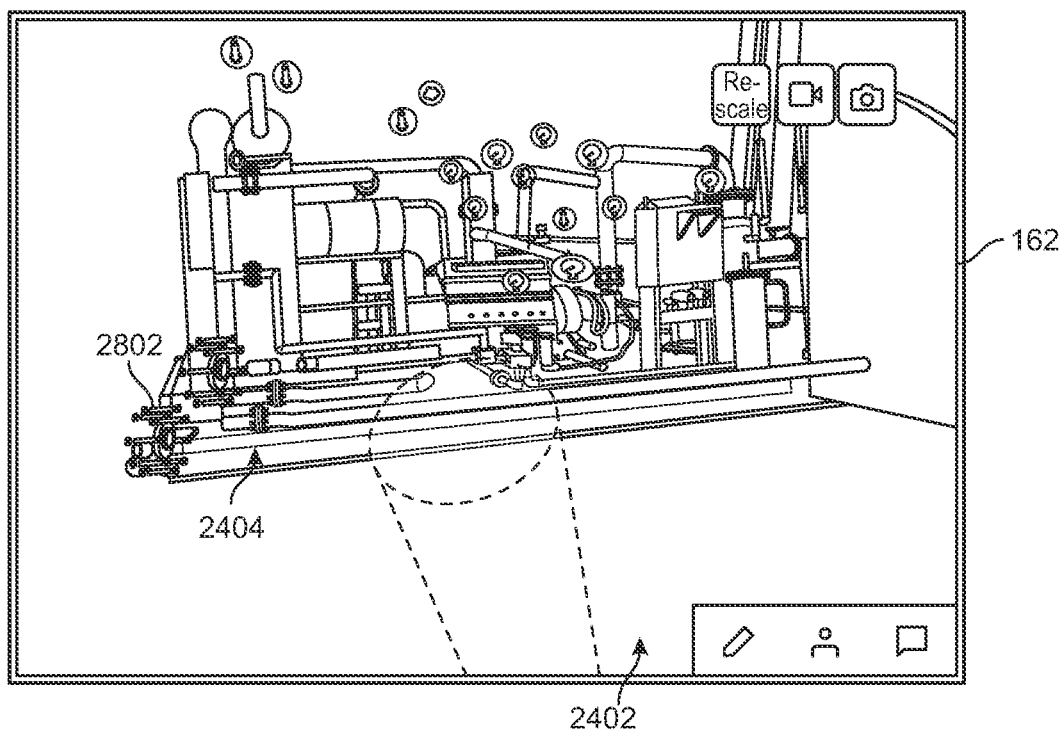
FIG. 28B is a pictorial illustration of the 3D virtual model of FIG. 28A being projected in a local environment for a user with extended reality and reflecting the exploded views.

Reciprocal rendering 1702 may refer to any type of graphical manipulation between a 3D virtual model 202 hosted on the first user's 160 (host) computing device 100 and any twin digital rendering 1712 of the 3D virtual model 202 shown on the second user's 162 computing device 100. This graphical manipulation may include, but not be limited to, annotations including notes and metadata, shapes, and free form drawings. These graphical manipulations may be 2D and/or 3D graphical manipulations and may be interactive. This graphical manipulation may further include animations, visualizations of any type, sensor readings and display of sensor data via data visualization 212. Further, graphical manipulation may include exploding views of all or a portion of a monitored item 206 such that the parts and structure of the 3D virtual model 202 and its reciprocal rendering for its digital twin 1712, In an exploded view, as known in the art, the 3D virtual model 202 and/or digital twin 1712 provide an illustration or visual picture, schematic or technical drawing of all or a component of the monitored item 206 that shows the relationship or order of assembly of various parts. It shows the components of an object slightly separated by distance or suspended in surrounding space in the case of a three-dimensional exploded diagram. FIG. 20, 21, and FIG. 28A-FIG. 28B show examples of exploded views, whereby FIG. 20-21 are examples of exploded views of a 3D virtual model 202 being physically adjacent to the monitored item 206 and FIG. 28A-FIG. 28B are examples of exploded views for 3D virtual models 202 that are not physically adjacent to a monitored item 206 but that are rather projected into a local environment or space 2402, as shown in FIG. 24, of a second user 162.

Accordingly, the first user 160 may be viewed as the host of the original 3D virtual model 202. Monitored item modeler 172 allows for multiple users (e.g., second user 162 and any other additional user) to engage in collaborative and interactive viewing sessions of the 3D virtual model 202 from their own computing devices 100, such as without limitation, a laptop, tablet, smartphone, or any other type of computing device. The ability to interact and collaborate when viewing the 3D virtual model 202 is a very important and helpful feature of monitored item modeler 172 and 3D virtual model 202. In this manner, multiple users can interact together and to view various views of the 3D virtual model 202 in order to better understand the physical structure and make up or any other aspects of the monitored item 206. Further, if the monitored item 206 includes one or more set of sensors 214, the 3D virtual model 202 can further help the users 160 and 162 (or any additional users) better understand the functioning and data obtained from these set of sensors 214 as represented by the virtual representation of the monitored item 250.

As noted above, in one or more non-limiting embodiments, monitored item modeler 172 includes 3D virtual model 202 which may include 3D visualization of multiple elements including a virtual representation of one or more monitored items 250. In some cases, the 3D virtual model 202 incorporates a virtual representation of a facility 164 as well as a virtual representation 250 of the one or more monitored items 206 and virtual sensors 204. In other instances, the 3D virtual model 202 may not represent a virtual representation of a facility 164, but only that of the monitored item 206 and/or virtual sensors 204.

In addition to the above, monitored item modeler 172 enables users 160-162 to utilize extended reality 1704 to project or view either a twin rendering of the 3D virtual model 202 (e.g., as shown in FIGS. 19-23 and FIGS. 25-28B) or any markings, overlays, exploded views, or other visual elements. Extended reality 1704 as used herein may refer to augmented reality, mixed reality, or virtual reality as known in the art. Virtual reality refers to the computer-generated simulation of a three-dimensional image or environment that can be interacted with in a seemingly real or physical way from a computing device 100. For example, the 3D virtual model 202 is an example of virtual reality. Augmented reality may refer to digital elements being added to a live view of a real world image or display that may be provided by a camera of a computing device 100. For example, the ability to superimpose or overlay digital circles 1904, as shown in FIG. 19, on the real world view of the monitored items 206 at a facility 164 is an example of augmented reality, because a real physical element has digital elements added and superimposed of the real physical element. Mixed reality may combine virtual reality as well as augmented reality together.

Further, monitored item modeler 172 may allow for Internet of Things (IoT) control system manipulation 1706. This IoT control system manipulation 1706 may include any digital manipulation 1708 or physical manipulation 1710 of the monitored item 206 and/or set of actual sensors 214 through interaction with the 3D virtual model 202. The digital manipulation 1708 or physical manipulation 1710 may relate to control of one or more functions and aspects of the monitored items 206 using the 3D virtual model 202 and the monitored item modeler 172 as well as the digital twin model 1712. In one embodiment, the actions are set by a first user 160 on the first computing device 100 and affects the digital twin model 1712 which in turn causes a physical manipulation 1710 or a digital manipulation 1708 of one or more functions or features of the monitored item 206. The digital twin model 1712 can communicate with the monitored item 206 and cause the physical manipulation 1710 or digital manipulation 1708 to occur in one or more non-limiting embodiments.

For example, if there is a valve that may be opened and closed on the monitored item 206, a user (e.g., first user 160 or second user 162) may be able to issue a control command that is directed to the digital twin model 1712 to open or close that valve on the monitored item 206 whenever needed or may set a timer to open or close the valve and the digital twin model 1712 causes such the outcome to occur. Further, the 3D virtual model 202 can monitor and provide a record of this action. Further, the 3D virtual model 202 may send a command to lock a security door at a facility 164 that is being monitored via the 3D virtual model 202 which is another example of physical manipulation 1702, and then the digital twin model 1712 can issue that command to the monitored item 206 for that action to occur and/or set an alarm/alert 208 for that act to occur at predetermined times.

An example of digital manipulation 1708 may include setting IoT alarms and sensor threshold values for the sensors 214 through the 3D virtual model 202. Accordingly, 3D virtual model 202 acts as a control software to determine certain functions are performed or activated for the monitored item 206 or set of sensors 214 and communicate these commands through the digital twin model 1712 in some non-limiting embodiments. The 3D virtual model 202 from the first user 160 may provide these control commands or the digital twin of the 3D virtual model 202 on the second user's 162 computing device 100 may communicate these control commands to the monitored item 202 and set of actual sensors 214. Accordingly, the physical components of the monitored items 206 and/or set of actual sensors 214 and their various functions or operation thereof may be partially or wholly controlled or manipulated by the 3D virtual model 202 in some instances and/or the digital twin model 1712.

It is noted that in a preferred embodiment, there may be back and forth communications between the 3D virtual model 202 on the first user 160's computing device 100 and the digital twin model 1712 on the second user 162's computing device 100. Accordingly, an action performed on the first user 160's 3D virtual model 202 can be seen, affect, and reflected on the digital twin model 1712, and an action performed on the second user 162's digital twin model 1712 can be seen, affect, and reflected on the 3D virtual model 202. In other embodiments, there may only be one way communication only between the first user's 160 digital edits to the second user 162.

It is further noted that the monitored item modeler 172 may incorporate an API to facilitate the communication of the graphical manipulation and digital edits made by the first user 160 for the second user 162 to view (and vice versa in some cases). In a non-limiting embodiment, the monitored item modeler 172 may include an API, such as WEBGL, which is a JavaScript API for rendering interactive 2D and 3D graphics within any compatible web browser without the use of plug-ins.

Figure 18:
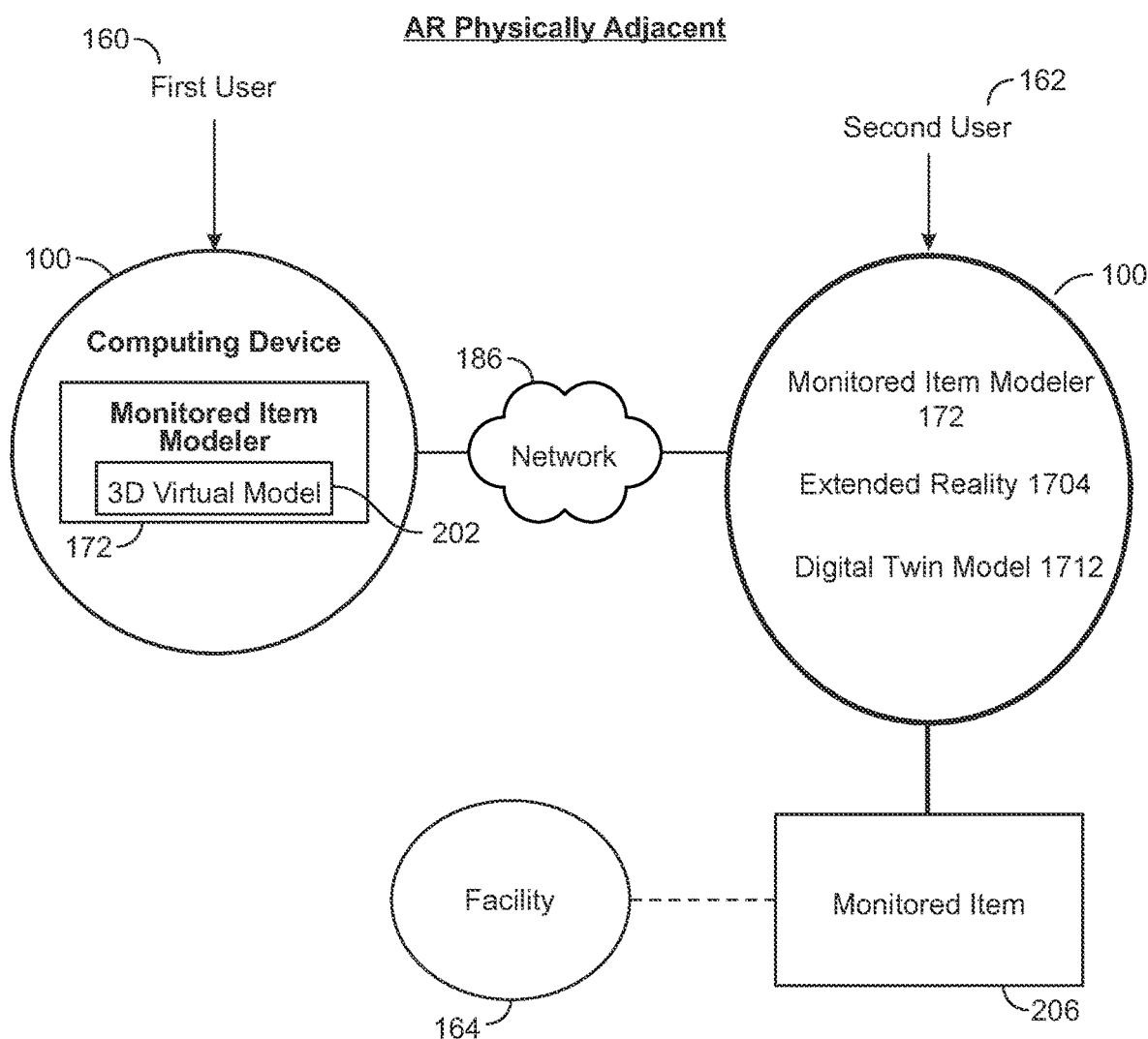
FIG. 18 is a block diagram of the monitored item modeling system incorporating extended reality/augmented reality graphical elements for a user that is physically adjacent to the monitored item.

FIG. 18 shows a block diagram of an (augmented reality) AR physically adjacent engagement setting, which allows for augmented reality or any other type of extended reality graphical manipulation 1704 in the presence of the target physical asset, i.e., monitored item 206. As shown in FIG. 18, the monitored item 206 may or may not be at a facility 164. As noted above, the monitored item modeler 172 may include a 3D virtual model 202 for a facility 164 that houses or contains one or more monitored items 206, or the 3D virtual model 202 may be a virtual model solely for one or more monitored items 206 without showing a virtual model of a facility 164. Further, the 3D virtual model 202 may include virtual sensors 204 in some cases that represent the actual sensors 214 and display their associated data and provide alerts 208 when the sensors 214 exceed operating threshold levels 210.

As shown in FIG. 18, the first user 160 may be remote from or physically separated a distance from the monitored item 206. The first user 160 may act as a host and have the monitored item modeler 172 and the 3D virtual model 202 displayed on his or her computing device 100. Through one or more networks, any graphical manipulation of the 3D virtual model 202 can be displayed on the second user's 162 computing device 100 via the monitored item modeler 172 that is accessible or downloaded onto the second user's 162 computing device 100. Further, any graphical manipulation, such as annotations, shapes (circles, squares, etc.), highlighting, exploding views, or any other type of graphical manipulation made by the first user 160 can be shown on the monitored item 206 in the case whereby the second user 162 is physically adjacent to the monitored item 206 and can position his or her computing device 100 such that the display screen of the second user's computing device 100 is positioned over the monitored item 206.

Thus, the graphical manipulation made by the first user 160 and communicated to the second user 162's monitored item modeler 172 is displayed to the second user 162 who is physically adjacent to the monitored item 206 and on site with the monitored item 206. In this manner, the first user 160 and second user 162 and any number of additional users thereafter may engage in an interactive and collaborative session when monitoring or discussing anything related to the monitored item 206. The first user 160 is enabled to guide the viewpoint of the second user 162 using any sort of digital manipulation and graphic rendering which is then visually displayed to the second user 162 in real time. This may be useful for a number of situations including for instruction and training purposes, maintenance, troubleshooting, documentation including creating reports documenting a malfunction at a facility 164 other location, and various other reasons.

There may be a few different types of engagement settings as further described below. One engagement setting may be referred to as Augmented Reality (AR) physically adjacent, meaning that there may be AR or other extended reality 1704 renderings in the presence of a target physical asset or monitored items 206 (e.g., as shown in FIGS. 17-23). Another engagement setting may be AR local, meaning that the AR or other extended reality 704 renderings are not in the presence of the physical asset, i.e., monitored item 206, but rather in a local space of the user (e.g., as shown in FIGS. 24-28B).

There may be various AR rendering modes. In a first mode, described as an overlay rendering mode, the AR renderings are applied directly to the physical asset, not a digital representation of the physical asset i.e., monitored item 206). In this sense, the monitored item 206 is the model with enrichments, such as digital annotations, visualizations, and exploded views, rendered on the monitored item 206. In adjacent rendering mode, a subset of components, rather than the full model, are digitally rendered in the space of the user (e.g., user 162) on the monitored item 206. In full rendering mode, the full model is rendered in the user's space, as shown for example in AR local shown in FIGS. 24-28B. In component rendering mode, the model components are digitally rendered in the space of the user.

FIG. 19 shows an example of extended reality 1704 application of the graphical renderings from a first user 160 who is not onsite and is physically remote from the monitored item 206. In FIG. 19, the monitored item 206 may be an industrial system of connections and devices as shown but is just an example as any type of object, device, system, or element may be a monitored item 206.

FIG. 19 shows in the viewpoint of a first user 160 and the first user's 160 display screen on the top right hand side. Monitored item modeler 172 may be accessible from or downloaded onto the first user's 160 computing device 100 and monitored item modeler 172 includes a 3D virtual model 202 of the monitored items 206. As such, there may be a virtual representation 250 of the monitored items 206 in the 3D virtual model 206. Because in this example, the monitored item 206 is located at a facility 164, there may also be a virtual depiction 250 of the facility 164 in the first user's 160 monitored item modeler 172.

As shown in FIG. 19, monitored item modeler 172 includes a bar 1902, which is an editing tool with one or more icons that allows first user 160 to edit or manipulate the 3D virtual model 202 and add any annotations or other graphical renderings as desired. The bar 1902 shown in FIG. 19 is exemplary but may include selectors for adding annotations to the 3D virtual model 202, including, but not limited to, adding text, pictures, highlights, shapes, lines, and any other type of annotation as desired. In this case, the first user 160 added the digitally created the digital circles 1904 shown in FIG. 19 on the 3D virtual model 202.

The second user 162, as shown in FIG. 19, is located at the facility 164 and onsite and physically adjacent to the monitored items 206. The second user 162 has their own monitored item modeler 172 accessible from the second user's 162 computing device 100, which is a tablet in this non-limiting example. The second user 162 can position the tablet 100 in front of the view of the second user 162 and view the monitored item 206 directly in front of the second user 162, The monitored item modeler 172 may access the camera of the tablet 100 and may visually show the circles 1904 (e.g., graphical manipulation) that were created by the first user 160 on the first user 160's computing device 100 and monitored item modeler 172 in the same location and in the same manner on the second user's 162 tablet 100. The digitally created circles 1904 may be example of extended reality 1704, because the circles 1904 are an example of augmented reality in which digital images are superimposed over a real world image or view using the camera of table 100 of the second user 162. Thus, the circles 1904 are overlaid over the same spot on the monitored item 206 as the virtual circles 1904.

In this manner, the first user 160 and the second user 162 may have a collaborative and interactive session and engage together in discussing or working on the areas shown by the circles 1904. The second user 162 may require the assistance of the first user 160 or vice versa for a particular issue with the functioning and operation of the monitored item 206 at the facility 164 and in this manner, the first user 160 and second user 162 can have a collaborative, interactive session using monitored item modeler 172 and the 3D virtual model 202. The second user 162 is aided in better understanding the viewpoint and perspective of the first user 160 and vice versa because both users 160 and 162 can visually see the annotations and graphical manipulation of first user 160 on the 3D virtual model 202 and can also see these annotations overlaid as shown in FIG. 19 over the monitored items 206 in the facility 164.

Further, it is noted that there are virtual sensors 204 depicted in the 3D virtual model 202 of the first user 160 in FIG. 19, as well as the icons (e.g., icons 305 and symbols 306) for the virtual sensors 204 are displayed in the 3D virtual model 202. Accordingly, the first user 160 can share any updates or information with second user 162 about the virtual sensors 204 and their counterparts, actual sensors 214, and vice versa if needed.

FIG. 20 and FIG. 21 show an example of the digital twin 1712 rendered in adjacent mode next to the monitored item 206, also shown in FIGS. 20-21. The monitored item 206, which is shown as a cylindrical component that is part of the system in FIGS. 20-21, has a 3D virtual model 202 that may be hosted on a first user 160's computing device 100 (not shown). The host or first user 160 may communicate with a second user 162 who is physically adjacent to the monitored item 206, and the monitoring item modeler 172 renders the relevant section of the 3D virtual model 202 to digitally superimpose the relevant virtual model portion reflecting monitored item 206 adjacent to the actual monitored item 206, as shown in FIGS. 20-21. Further, the first user 160 or host can choose to show an exploding view as shown in FIGS. 20-21 in which the assembly of components for monitored item 206 are shown in as separated from one another in the order of their assembly and formation so the second user 162 who is adjacent to the monitored item 206 may better understand the monitored item 206 itself. This may be particularly useful in cases of training and education to any users or operators of monitored items 206 and their systems.

FIG. 21 further shows that the first user 160 may highlight 2102 portions of the 3D virtual model 202 representing monitored item 206 and the second user 162 can see the highlighted portion 2102 and have their attention drawn to this highlighted portion 2102 to facilitate the discussion and collaborative interaction session between the first user 160 and the second user 162 or any other additional users that are part of the viewing session. FIG. 21 thus shows an example of reciprocal highlighting 2102.

Figure 22:
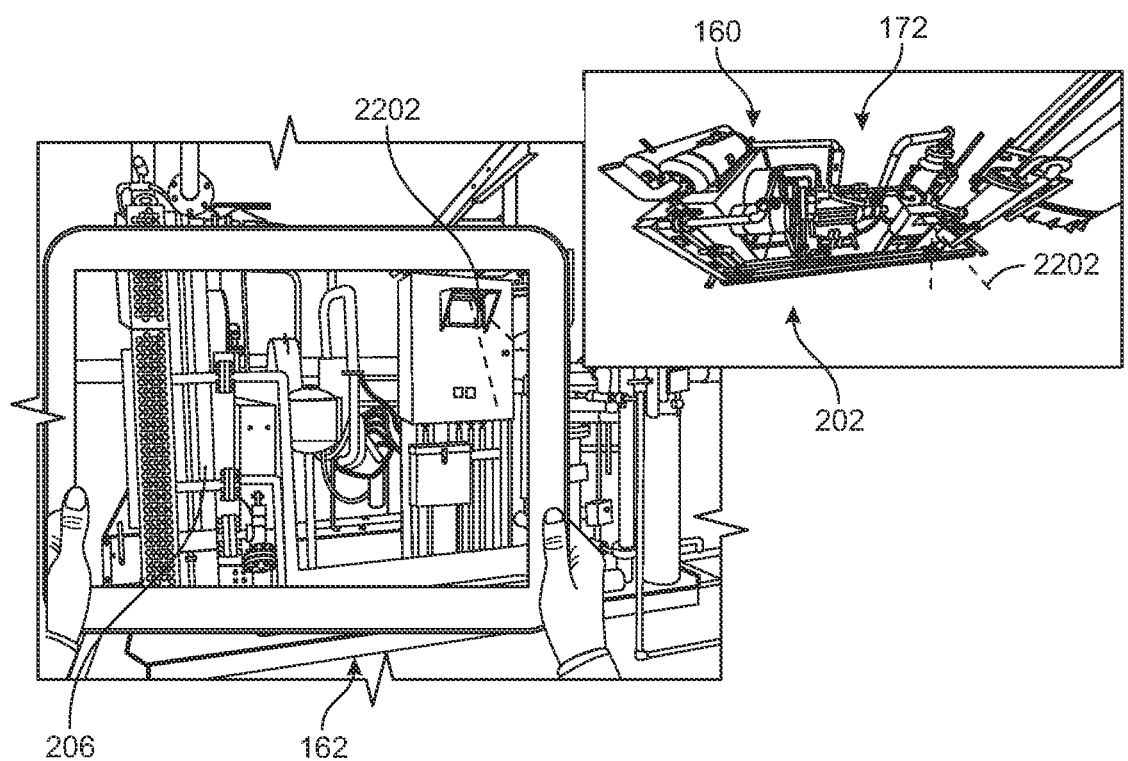
FIG. 22 is a pictorial illustration of directed alignment of the 3D virtual model for a monitored item and a graphical rendering of the directed alignment where the user is physically adjacent to the monitored item at a facility.

FIG. 22 shows an example of a directed alignment feature that may be part of monitoring item modeler 172. In the directed alignment feature, the first user 160 may use a digital arrow 2202 or the like to highlight a given part of the 3D virtual model 202, which in turn adjusts the view point of the 3D virtual model 202. The AR physically adjacent rendering for the second user 162 renders a reciprocal focal point/ray cast showing the same arrow 2202 and thereby delineating a desired perspective the 3D virtual model 202 user (e.g., first user 160), wishes to guide the second user 162.

Figure 23:
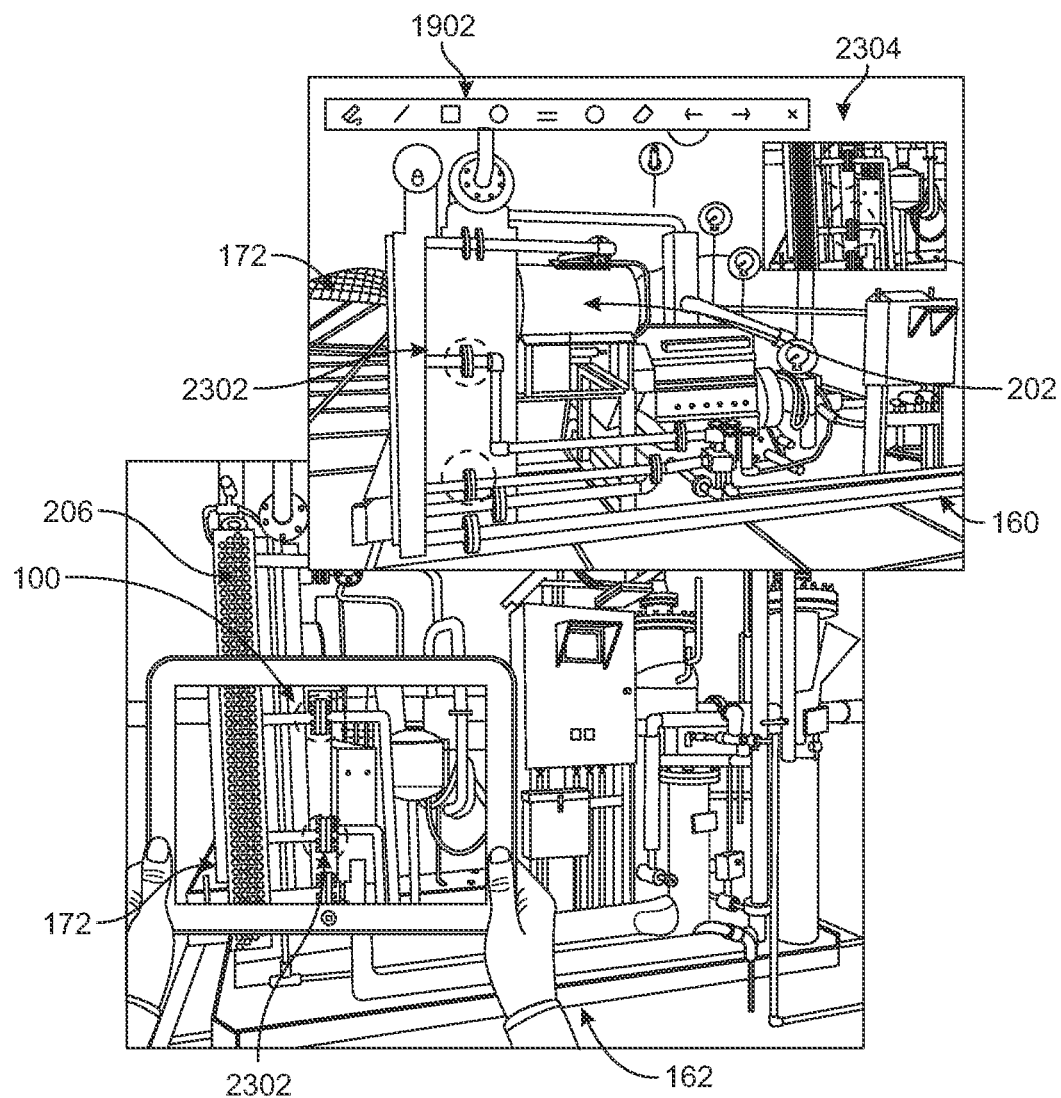
FIG. 23 is a pictorial illustration of the 3D virtual model and representation of the multiple user's viewpoints of the 3D virtual model and the monitored item.
Figure 24:
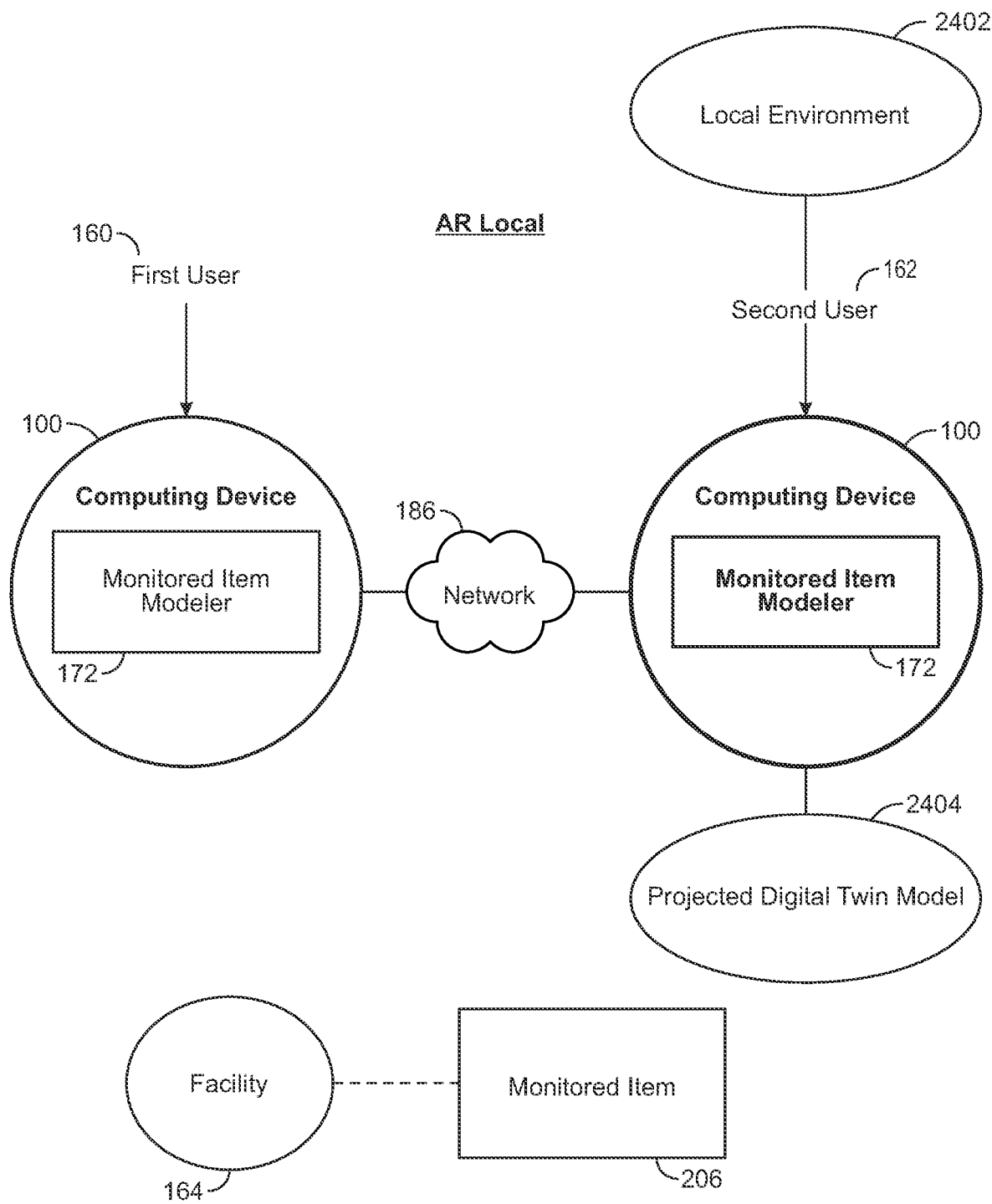
FIG. 24 is a block diagram of a monitored item modeling system and 3D virtual model with reciprocal rendering of the 3D virtual model in a user's local environment.

FIG. 23 shows an example of video and audio stream included in the monitored item modeler 172 such that the first user 160 has a "pie inside a pic" view of what the second user 162 is seeing. For example, in FIG. 23, the first user 160 has made digital circles 2302 over a specific part or area of the 3D virtual model 202, which in turn reflects the same digital circles 2302 over the actual monitored item 206 in the same spot and location as the 3D virtual model 202. In the window 2304 shown in FIG. 23, the first user 160 can view the same viewpoint as that provided to the second user 162. Accordingly, the first user 160 can view the 3D virtual model 202 on his or her computing device 100 and via the monitored item modeler 172, while also having an embedded window 2304 (e.g., as further shown in FIG. 25A, FIG. 26A, FIG. 27A, and FIG. 28A) that is minimized or located in the same screen as the 3D virtual model 202 to also see and better understand what the second user 162 is seeing. This feature may further aid to have an interactive, collaborative training or working session and discussion between the first user 160 and the second user 162.

It is noted that in some cases, the first user 160 may not be physically remote from the monitored item 206. Rather, the first user 160 may be physically adjacent to the monitored item 206 and may desire to see exploded views and other digital and graphical manipulations of the monitored item 206. For example, the first user 160 may choose to have all or a portion of the digital twin 1712 shown next to a monitored item 206 (e.g., as shown in FIG. 20 and FIG. 21) or for various annotations to overlay a monitored item 206 as shown in FIGS. 19 and 23 for the first user 160 to work with or better understand the structure and components of the monitored item 206. Accordingly, it is noted that it may not be required that the first user 160 provide edits for a second user 162 to use and that the first user 160 may be physically adjacent to a monitored item 206 and use any of the AR physical adjacent rendering features as described above without communicating and sharing with a second user 162.

FIG. 24 is a block diagram of an AR local rendering method of using the monitored item modeler 172. In this embodiment, the first user 160 is remote from the second user 162, and both the first user 160 and the second user 162 are also physically remote and not physically adjacent to the monitored item 206. The second user 162 is located in his or her local environment 2402 which is physically remote from the first user 160. Further, the monitored item 206 may or may not be located within a facility 164 that may or may not be depicted or illustrated in the 3D virtual model 202.

As shown in FIG. 24, the augmented reality (AR) or any other extended reality local rendering feature allows the 3D virtual model 202 as shown on the first user's 160 computing device 100 via the monitored item modeler 172 to be projected as a digital twin 2404 in the local environment 2402 of the second user 162. FIGS. 25A-28B further illustrate this example of AR local as shown in the block diagram of FIG. 24.

Figure 25A:
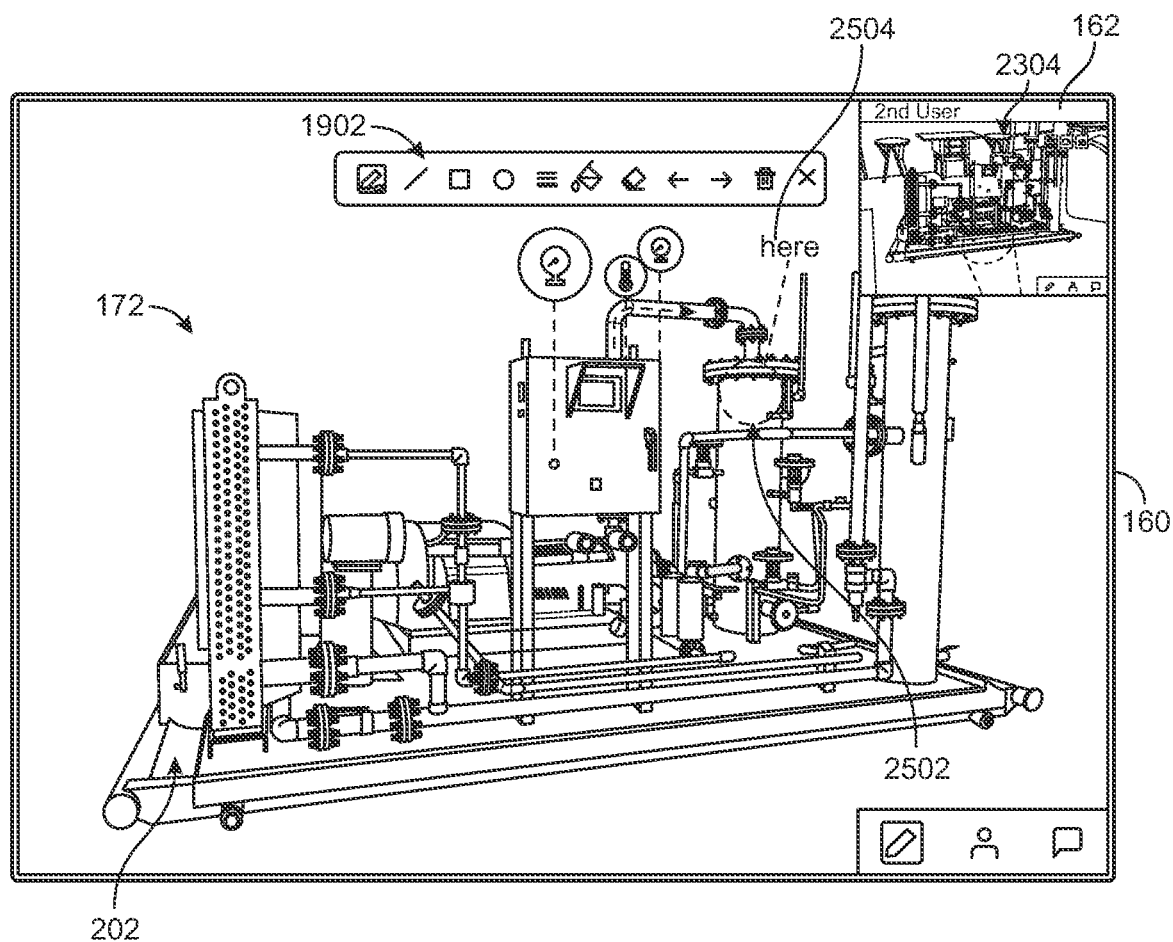
FIG. 25A is a pictorial illustration of a 3D virtual model with specific graphical manipulation.

FIG. 25A shows an example of a 3D virtual model 202 of a monitored item 206 shown from the first user's 160 perspective. As shown in FIG. 25A, the first user 160 is using the monitored item modeler 172 software application accessible from the first user's 160 computing device 100. A bar or editing tool 1902 is included in the monitored item modeler 172 of the first user 160. The bar 1902 shown in FIG. 25A (and FIG. 19) is exemplary, but may include functions that allow adding text, lines, shapes, any other type of annotation or visualization or view directly to the 3D virtual model 202, which can then be reflected in the projected digital twin 2404 that is projected in the local space 2402 of the second user 162.

Figure 25B:
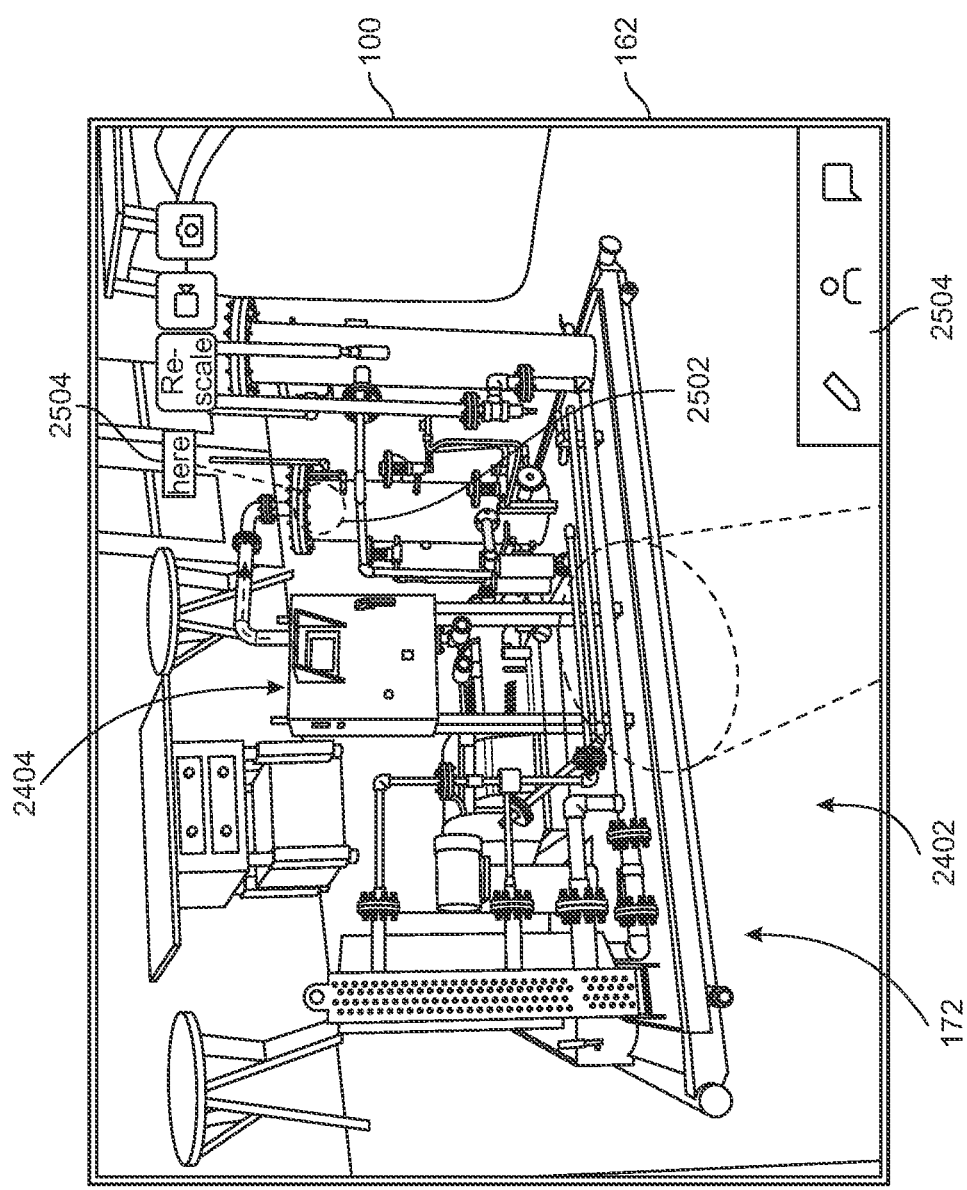
FIG. 25B is a pictorial illustration of the 3D virtual model of FIG. 25A represented with extended reality and the same graphical manipulation projected in a user's local environment.

FIG. 25B shows the projected digital twin 2404 projected in the local space 2402 of the second user 162 via the computing device 100 of the second user 162 and as shown using the monitored item modeler 172 on the second user's 162 computing device 100. The exemplary local space 2402 of the second user 162 as shown in FIG. 25B is the second user 162's living room at home. Thus, even though both the first user 160 and the second user 162 are both physically remote from each and are both physical remote and not adjacent to the monitored item 206 that the 3D virtual model 202 and the projected digital twin model 2404 represent, the first user 160 and the second user 162 can see a highly realistic and interactive representation of the monitored item 206 from their own local environments.

FIG. 25A includes digital edits such as the digital circle 2502 and the text 2504 shown in FIG. 25A. The projected digital twin model 2404 displays and reflects the same digital circle 2502 and the text 2504 in the projected digital twin model 2404 that is viewable in the second user 162's local space 2402 from the second user 162's computing device 100. As such, the first user 160 can guide the discussion regarding the projected digital twin model 2404 and share the edits and augmented reality annotations 2502 and 2504 made in the 3D virtual model 202. It is noted that FIG. 25A further includes an embedded window 2304 that shows the viewpoint of the second user 162.

Figure 26A:
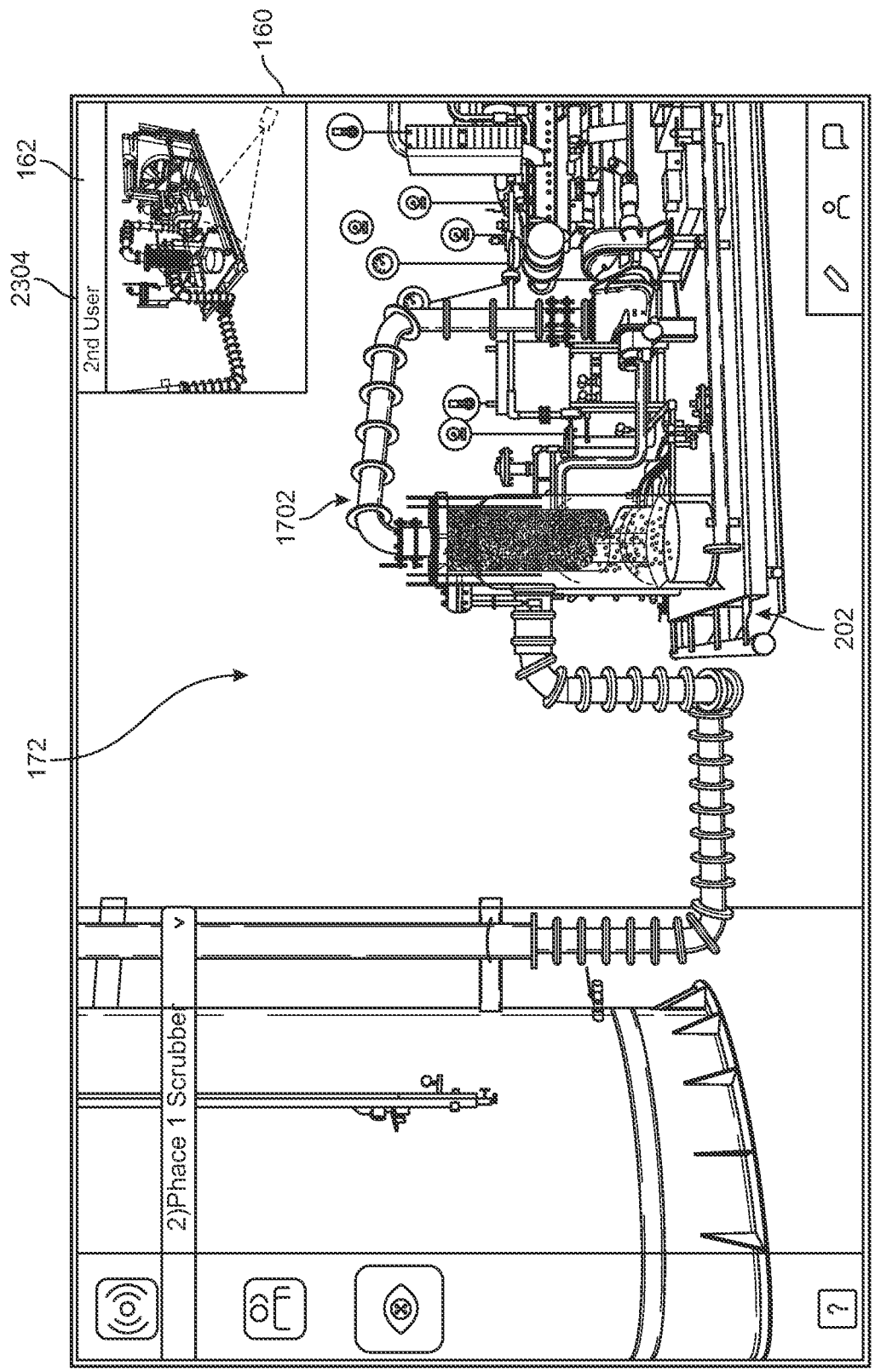
FIG. 26A is a pictorial illustration of an interface for graphically manipulating a 3D virtual model of a monitored item.
Figure 26B:
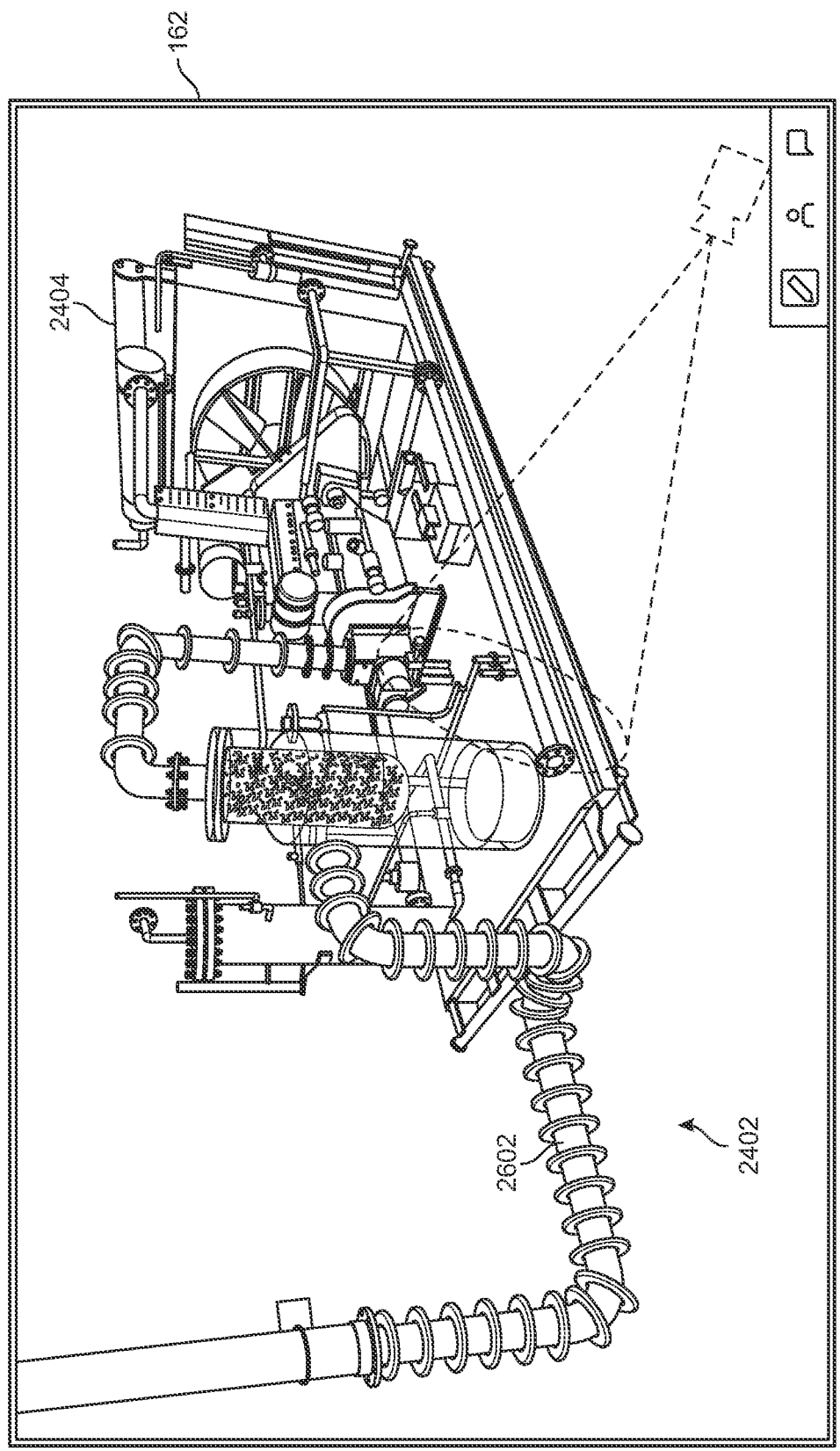
FIG. 26B is a pictorial illustration of the 3D virtual model of FIG. 26A projected in a user's local environment with graphical manipulation and visualizations determined by a first user and controller of the 3D virtual model.

FIG. 26A shows an example of the view of a 3D virtual model 202 from the first user 160's perspective. The first user 160 can add any additional visual elements, such as 2602, which are then reflected in the projected digital twin 2404 in the second user 162's local space 2402 as an example of AR local rendering.

Figure 27A:
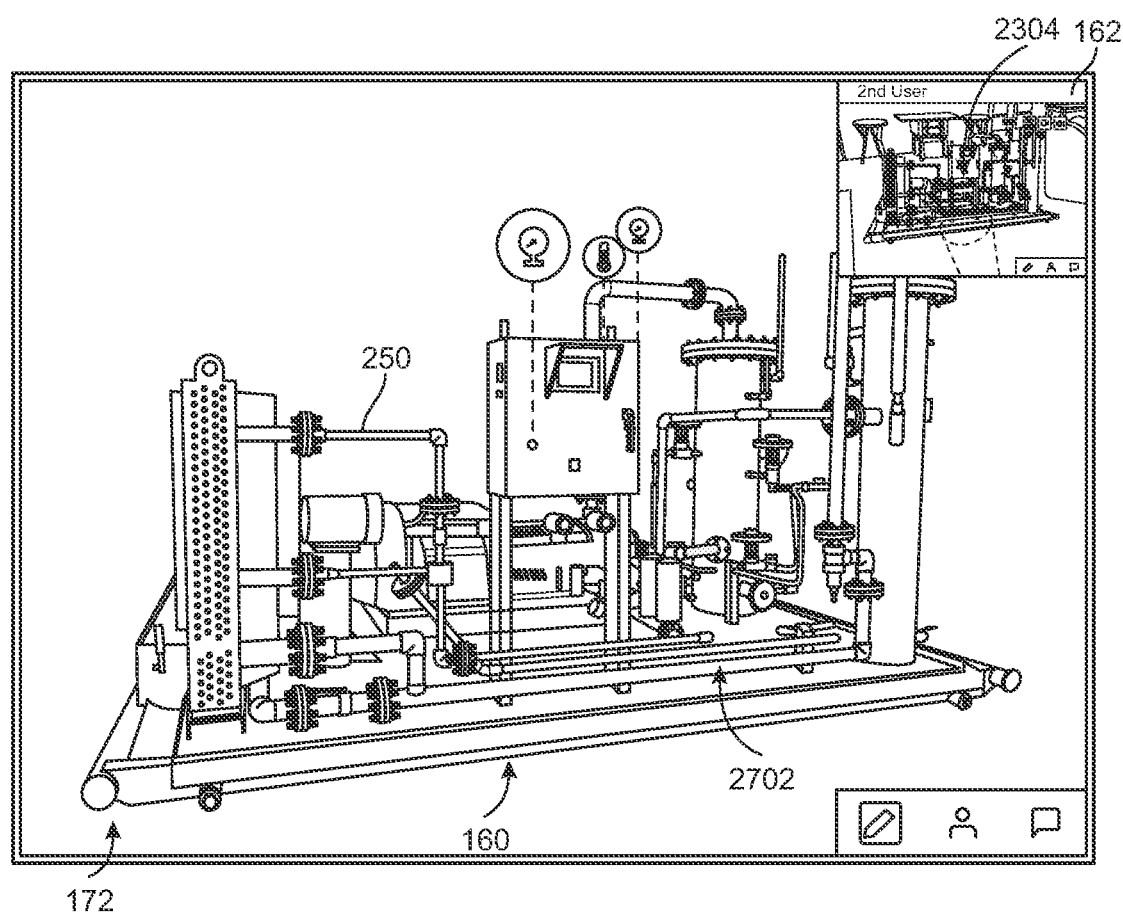
FIG. 27A is a pictorial illustration of a 3D virtual model being controlled by a first user and particular graphical manipulation of the 3D virtual model.
Figure 27B:
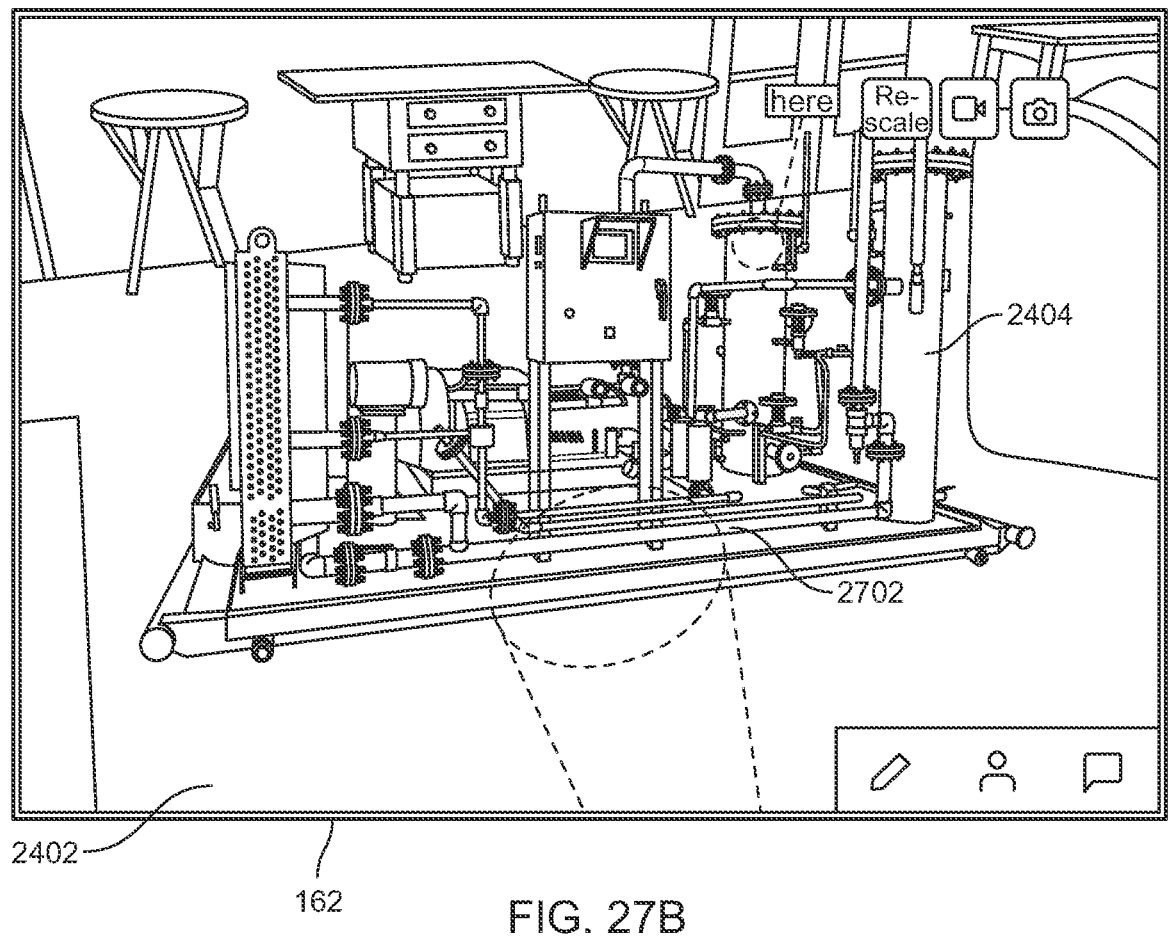
FIG. 27B is a pictorial illustration of the 3D virtual model of FIG. 27A reflecting the graphical manipulation.

FIG. 27A shows an example of the view of the 3D virtual model 202 from the first user 160's perspective having added highlighting 2702 to an element of the 3D virtual model 202, which is reflected in the projected digital twin 2404 that is projected from the second user 162's computing device 100 and monitored item modeler 172 in the local environment 2402 of the second user 162.

FIG. 28A shows an example of the of the 3D virtual model 202 from the first user 160's perspective with an example of an exploded view 2802 of particular components of the 3D virtual model 202 shown in the monitored item modeler 172 of the first user 160's computing device 100. FIG. 28B shows the corresponding projected digital twin 2404 of the 3D virtual model 202 in the second user 162's local environment 2402 with the same exploded view 2802. The second user 162 is thus enabled to see the same exploded elements as the first user 160 from physically separate devices and from different locations of a highly detailed virtualization of the monitored item 206.

In one or more non-limiting embodiments, any graphical manipulations provided by the reciprocal rendering 1702 of the monitored item modeler 1702 may appear to the second user 162 as if the graphical manipulations are three dimensional in the second user 162's local environment 2402. Accordingly, as shown in FIGS. 25A-28B the projected twin digital model 2404 and any graphical manipulations appear as if they are projected three dimensionally in front of the second user 162's computing device 100 and in their local environment 2402 adjacent to other real world objects or elements. This highly realistic 3D representation of a digital twin model 2404 and graphical manipulations better enables the second user 162 to have a collaborative, interactive, and/or instructional working sessions with the first user 160 and/or to understand the monitored item 206. It is noted that the 3D virtual model 202 and/or any graphical manipulations shown in FIG. 20-23 for the physically adjacent rendering may also have a highly realistic 3D representation in a real space or real environment next to one or more monitored items 206.

Many advantages and benefits, as discussed above, are offered by the one or more non-limiting embodiments for a 3D virtual model 202 as described herein. Connecting the physical assets and/or monitored items 206 and/or sensors 214 to the 3D virtual model 202 and digital twin model 1712 allows for real time streaming of data from the monitored item 206 and/or sensors 214. The 3D virtual model 202 and digital twin model 1712 are highly accurate, photorealistic models that can help one or more companies or users experience faster triage time, instant document retrieval, remote collaboration, and better reporting through video playback including rewind features to rewind through a series of happenings or events related to the monitored items 206 and/or sensors 214 and reflected by the 3D virtual model 202 and/or digital twin model 1712. The one or more systems herein allow a user to visualize and view the real-time operation of monitored item 206 and/or sensor 214 data and any other data using an Internet of Things (IOT) platforms. One of ordinary skill may envision other advantages and benefits that are within the scope of the present description.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or table of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A system for providing a virtual visualization of one or more monitored items having a set of actual sensors, comprising:
   a computing device having a display screen;
   one or more memory; and
   one or more processors configured to:
   display a three-dimensional (3D) virtual model of the one or more monitored items, wherein the one or more monitored items are physical assets that exist in a real world environment, and wherein the set of actual sensors are real sensors installed to monitor the one or more monitored items, wherein the 3D virtual model includes a set of virtual sensors depicting the set of actual sensors, wherein each sensor of the set of virtual sensors in the 3D virtual model is displayed in substantially the same location as an actual sensor of the set of actual sensors is positioned in the real world environment;

collect relevant data from each actual sensor of the set of actual sensors installed to monitor the one or more monitored items and display a visualization for each virtual sensor of the set of virtual sensors corresponding to each actual sensor of the set of actual sensors as displayed in the same location in the 3D virtual model as the actual sensor of the set of actual sensors is positioned in the real world environment;

navigate through the 3D virtual model to view any virtual sensor of the set of virtual sensors to monitor the one or more monitored items and the set of actual sensors in real time, wherein views of the 3D virtual model may be altered and viewed from multiple angles and perspectives;

responsive to a threshold level being triggered for an actual sensor of the actual set of sensors that exceeds normal operating conditions, direct attention to a virtual sensor representing the actual sensor that exceeds normal operating conditions, further comprising:

draw attention to the virtual sensor exceeding the normal operating conditions in the 3D virtual model; and provide an alert, wherein the alert comprises a visual alert, an audio alert, or a combination of a visual and audio alert; and allow a user to navigate through the 3D virtual model to view historical data of any virtual sensor of the set of virtual sensors by rewinding or replaying a stored version of the 3D virtual model.

2. The system of claim 1, wherein the one or more processors configured to draw attention to the virtual sensor exceeding the normal operating conditions in the 3D virtual model are configured to automatically zoom in on the virtual sensor exceeding the normal operating conditions in the 3D virtual model.

3. The system of claim 1, wherein the 3D virtual model further depicts interior contents of the one or more monitored items.

4. The system of claim 1, wherein the 3D virtual model further comprises a sensor cluster that groups together the set of virtual sensors of the 3D virtual model and displays relevant information for each virtual sensor in the sensor cluster.

5. The system of claim 1, wherein metadata for each virtual sensor is available for viewing in the 3D virtual model.

6. The system of claim 1, wherein the one or more processors are configured to generate one or more reports or documents incorporating segments or snapshots of the 3D virtual model.

7. The system of claim 1, wherein the visualization of relevant data comprises charts, graphs, or tables containing information about an operation and maintenance of each actual sensor.

8. A system for displaying graphical manipulations of a 3D virtual model from a first user to a second user, comprising:

a computing device having a display screen;
one or more memory; and
one or more processors configured to:
display a 3D virtual model on a first computing device of a first user;
display a graphical manipulation of the 3D virtual model on the first computing device of the first user; and display reciprocal renderings of the graphical manipulation on a second computing device of a second user, wherein the second user is physically adjacent to a monitored item that is illustrated in the 3D virtual model, wherein the monitored item is a physical asset that exists in a real world environment and the second user is physically adjacent to the physical asset, and wherein the second user can view the reciprocal renderings of the graphical manipulation taken from the 3D virtual model and imposed physically adjacent to the monitored item.

9. The system of claim 8, wherein the graphical manipulations comprise annotations to the 3D virtual model including text, shapes, and images.

10. The system of claim 8, wherein control of one or more functions and aspects of the monitored item can be manipulated via the 3D virtual model, wherein one or more functions and aspects can be physically or digitally manipulated.

11. The system of claim 8, wherein the graphical manipulations comprise an exploded view of the monitored item.

12. The system of claim 8, wherein the graphical manipulations comprise highlighting one or more components of the monitored item.

13. The system of claim 8, wherein the one or more processors are configured to display the graphical manipulations of the 3D virtual model as an overlay, wherein the second user positions the second computing device proximate to the monitored item to view the graphical manipulations overlaid over the monitored item from the second computing device.

14. The system of claim 8, wherein the one or more processors are configured to display all or a portion of the 3D virtual model adjacent to the monitored item.

15. The system of claim 8, wherein the first user guides a viewpoint of the second user when viewing the 3D virtual model for directed alignment.

16. The system of claim 8, wherein the 3D virtual model includes an editing tool to add annotations and other actions to create the graphical manipulations of the 3D virtual model.

17. The system of claim 8, wherein the graphical manipulations are rendered and displayed as a type of extended reality on the second computing device of the second user.

18. The system of claim 8, wherein the graphical manipulation on the second computing device is displayed as a type of augmented reality.

19. A system for displaying graphical manipulations of a 3D virtual model from a first user to a second user, comprising:

a computing device having a display screen;
one or more memory; and
one or more processors configured to:
display a 3D virtual model of a monitored item on a first computing device of a first user, wherein the 3D virtual model is a highly accurate and realistic 3D virtual model of the monitored item, wherein the monitored item is a physical asset that exists in a real world environment;
display the graphical manipulations of the 3D virtual model on the first computing device of the first user, wherein the graphical manipulations are made by the first user on the 3D virtual model of the monitored item; and display a projected digital twin rendering of all or a part of the 3D virtual model in a local environment for a second user using a second computing device;

wherein the first user and the second user are not physically adjacent to a monitored item that is illustrated in the 3D virtual model, and wherein the second computing device and the first computing device are remote from each other and are not in a same location, wherein the projected digital twin rendering of all or part of the 3D virtual model is displayed in a local environment using the second computing device, wherein the local environment of the second computing device is different from a local environment of the first user.

20. The system of claim 19, wherein the graphical manipulations comprise annotations to the 3D virtual model including text, shapes, and images.

21. The system of claim 19, wherein the graphical manipulations comprise an exploded view of the monitored item.

22. The system of claim 19, wherein the graphical manipulations comprise highlighting one or more components of the monitored item.

23. The system of claim 19, wherein the 3D virtual model includes an editing tool to add annotations and other actions to create the graphical manipulations of the 3D virtual model.

24. The system of claim 19, wherein the graphical manipulations are rendered and displayed as a type of extended reality on the second computing device of the second user.

25. The system of claim 19, wherein the graphical manipulations on the second computing device is displayed as a type of augmented reality.

26. The system of claim 19, wherein the system allows for a collaborative and interactive engagement between the first user and the second user regarding the monitored item.

* * * * *